(12) United States Patent
Koga et al.

(10) Patent No.: US 12,365,535 B2
(45) Date of Patent: *Jul. 22, 2025

(54) LIGHTING SYSTEM FOR A REFUSE VEHICLE

(71) Applicant: Oshkosh Corporation, Oshkosh, WI (US)

(72) Inventors: Jeffrey Koga, Oshkosh, WI (US);
Emily Davis, Rochester, MN (US);
Jerrod Kappers, Oshkosh, WI (US);
Vince Schad, Oshkosh, WI (US);
Robert S. Messina, Oshkosh, WI (US);
Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,079

(22) Filed: May 21, 2024

(65) Prior Publication Data

US 2024/0300734 A1    Sep. 12, 2024

Related U.S. Application Data

(63) Continuation of application No. 17/945,254, filed on Sep. 15, 2022, now Pat. No. 12,017,849, which is a
(Continued)

(51) Int. Cl.
*B65F 3/08*    (2006.01)
*B60Q 1/00*    (2006.01)
(Continued)

(52) U.S. Cl.
CPC .............. *B65F 3/08* (2013.01); *B60Q 1/0023* (2013.01); *B60Q 1/24* (2013.01); *B65F 3/02* (2013.01);
(Continued)

(58) Field of Classification Search
CPC .................................. B65F 3/02; B60Q 1/24
See application file for complete search history.

(56) References Cited

U.S. PATENT DOCUMENTS

| 5,378,010 A | 1/1995 | Marino et al. |
| 6,105,984 A | 8/2000 | Schmitz et al. |

(Continued)

*Primary Examiner* — Jonathan Snelting
(74) *Attorney, Agent, or Firm* — Foley & Lardner LLP

(57) ABSTRACT

A refuse vehicle includes a chassis, a vehicle body supported by the chassis, a lift assembly, and a projector. The vehicle body defines a receptacle for storing refuse. The lift assembly is configured to selectively engage a waste container. The lift assembly is movable between a first position and a second position. The projector is positioned to emit light outwardly away from the refuse vehicle and proximate the lift assembly to define a target area.

20 Claims, 19 Drawing Sheets

Related U.S. Application Data continuation of application No. 17/232,228, filed on Apr. 16, 2021, now Pat. No. 11,465,838.

(60) Provisional application No. 63/011,422, filed on Apr. 17, 2020.

(51) Int. Cl.
  *B60Q 1/24* (2006.01)
  *B65F 3/02* (2006.01)

(52) U.S. Cl.
  CPC ..... *B60Q 2400/40* (2013.01); *B60Y 2200/144* (2013.01); *B65F 2003/0223* (2013.01); *B65F 2003/025* (2013.01); *B65F 2210/139* (2013.01); *B65F 2210/168* (2013.01)

(56) References Cited

U.S. PATENT DOCUMENTS

| | | | |
|---|---|---|---|
| 6,516,914 B1 | 2/2003 | Andersen et al. |
| 6,757,597 B2 | 6/2004 | Yakes et al. |
| 6,885,920 B2 | 4/2005 | Yakes et al. |
| 7,164,977 B2 | 1/2007 | Yakes et al. |
| 7,277,782 B2 | 10/2007 | Yakes et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,448,460 B2 | 11/2008 | Morrow et al. |
| 7,520,354 B2 | 4/2009 | Morrow et al. |
| 7,689,332 B2 | 3/2010 | Yakes et al. |
| 7,711,460 B2 | 5/2010 | Yakes et al. |
| 7,848,857 B2 | 12/2010 | Nasr et al. |
| 7,931,103 B2 | 4/2011 | Morrow et al. |
| 8,000,850 B2 | 8/2011 | Nasr et al. |
| 8,139,109 B2 | 3/2012 | Schmiedel et al. |
| 8,561,735 B2 | 10/2013 | Morrow et al. |
| 8,947,531 B2 | 2/2015 | Fischer et al. |
| 9,045,014 B1 | 6/2015 | Verhoff et al. |
| 9,174,686 B1 | 11/2015 | Messina et al. |
| 9,420,203 B2 | 8/2016 | Broggi et al. |
| 9,656,640 B1 | 5/2017 | Verhoff et al. |
| 9,707,869 B1 | 7/2017 | Messina et al. |
| 9,981,803 B2 | 5/2018 | Davis et al. |
| 10,065,555 B2 | 9/2018 | Abrams et al. |
| 10,106,072 B2 | 10/2018 | Linan et al. |
| D843,281 S | 3/2019 | Gander et al. |
| 10,414,067 B2 | 9/2019 | Datema et al. |
| 10,434,995 B2 | 10/2019 | Verhoff et al. |
| D871,283 S | 12/2019 | Gander et al. |
| D888,629 S | 6/2020 | Gander et al. |
| 10,688,903 B2 | 6/2020 | Marji et al. |
| 10,800,605 B2 | 10/2020 | Rocholl et al. |
| 10,843,379 B2 | 11/2020 | Rocholl et al. |
| 10,859,167 B2 | 12/2020 | Jax et al. |
| D907,544 S | 1/2021 | Wall et al. |
| D909,934 S | 2/2021 | Gander et al. |
| 10,987,829 B2 | 4/2021 | Datema et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,465,838 B2 | 10/2022 | Koga et al. |
| 12,017,849 B2 * | 6/2024 | Koga ........................ B65F 3/08 |
| 2018/0044109 A1 | 2/2018 | Butcher et al. |
| 2018/0319642 A1 | 11/2018 | Pronger et al. |
| 2019/0185077 A1 | 6/2019 | Smith et al. |
| 2019/0344475 A1 | 11/2019 | Datema et al. |
| 2019/0351883 A1 | 11/2019 | Verhoff et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0348681 A1 | 11/2020 | Clifton et al. |
| 2020/0348764 A1 | 11/2020 | Clifton et al. |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |
| 2020/0398772 A1 | 12/2020 | Wildgrube et al. |
| 2020/0398857 A1 | 12/2020 | Clifton et al. |
| 2020/0399058 A1 | 12/2020 | Rocholl et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |

\* cited by examiner

LIGHTING SYSTEM FOR A REFUSE VEHICLE

CROSS-REFERENCE TO RELATED APPLICATION

This Application is a continuation of U.S. patent application Ser. No. 17/945,254, filed Sep. 15, 2022, which is a continuation of U.S. patent application Ser. No. 17/232,228, filed Apr. 16, 2021, which claims priority to U.S. Provisional Patent Application No. 63/011,422, filed Apr. 17, 2020, the contents of which are hereby incorporated by reference in their entireties.

BACKGROUND

Refuse vehicles are often used to pick up and remove waste from customers' property. To promote efficiency, refuse vehicles typically operate on scheduled waste removal days, where each vehicle can collect waste from several locations along a route. Customers position waste containers in some predetermined and accessible location on their property (or onto the nearby street or sidewalk) so that the contents of the waste containers can be readily transferred into the refuse vehicle. Refuse vehicles often have a lifting mechanism to engage and raise the waste container off the ground surface, to a position where the waste container is inverted or angled downward toward an on-board waste receptacle. Aided by gravity, waste falls out of the waste container into the on-board receptacle. The lifting mechanism then lowers the waste container back to the ground surface below. Significant amounts of time can be spent trying to align the waste container relative to the lifting mechanism for waste removal.

SUMMARY

One embodiment relates to a refuse vehicle. The refuse vehicle includes a chassis, a vehicle body supported by the chassis, a lift assembly, and a projector. The vehicle body defines a receptacle for storing refuse. The lift assembly is configured to selectively engage a waste container. The lift assembly is movable between a first position and a second position. The projector is positioned to emit light outwardly away from the refuse vehicle and proximate the lift assembly to define a target area.

Another embodiment relates to a refuse vehicle. The refuse vehicle includes a chassis, a body coupled to the chassis, a lift assembly coupled to at least one of the body or the chassis, and a refuse container detection system. The body defines a receptacle for storing refuse. The lift assembly is coupled to at least one of the body or the chassis. The refuse container detection system is configured to facilitate detecting when a refuse container is positioned within a target area for engagement by the lift assembly. The refuse container detection system includes a projector emitting light outward from one of (i) the body or (ii) a carry can coupled to the lift assembly. The emitted light from the projector defines a boundary of the target area with light.

Still another embodiment relates to a refuse vehicle. The refuse vehicle includes a chassis, a vehicle body supported by the chassis, a lift assembly, a projector, a camera, and a display. The vehicle body defines a receptacle for storing refuse. The lift assembly is configured to selectively engage a waste container. The lift assembly is movable between a first position and a second position. The projector is positioned to emit light outwardly away from the refuse vehicle and proximate the lift assembly. The light defines a target area. The camera is positioned to monitor a field of view outward from the refuse vehicle. The camera is configured to detect the light emitted by the projector. The field of view includes the target area. The display is positioned within the vehicle body and in communication with the camera. The display is configured to receive a signal from the camera to facilitate presenting (i) the field of view and (ii) at least a portion of the light emitted by the projector. The portion defines the target area.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
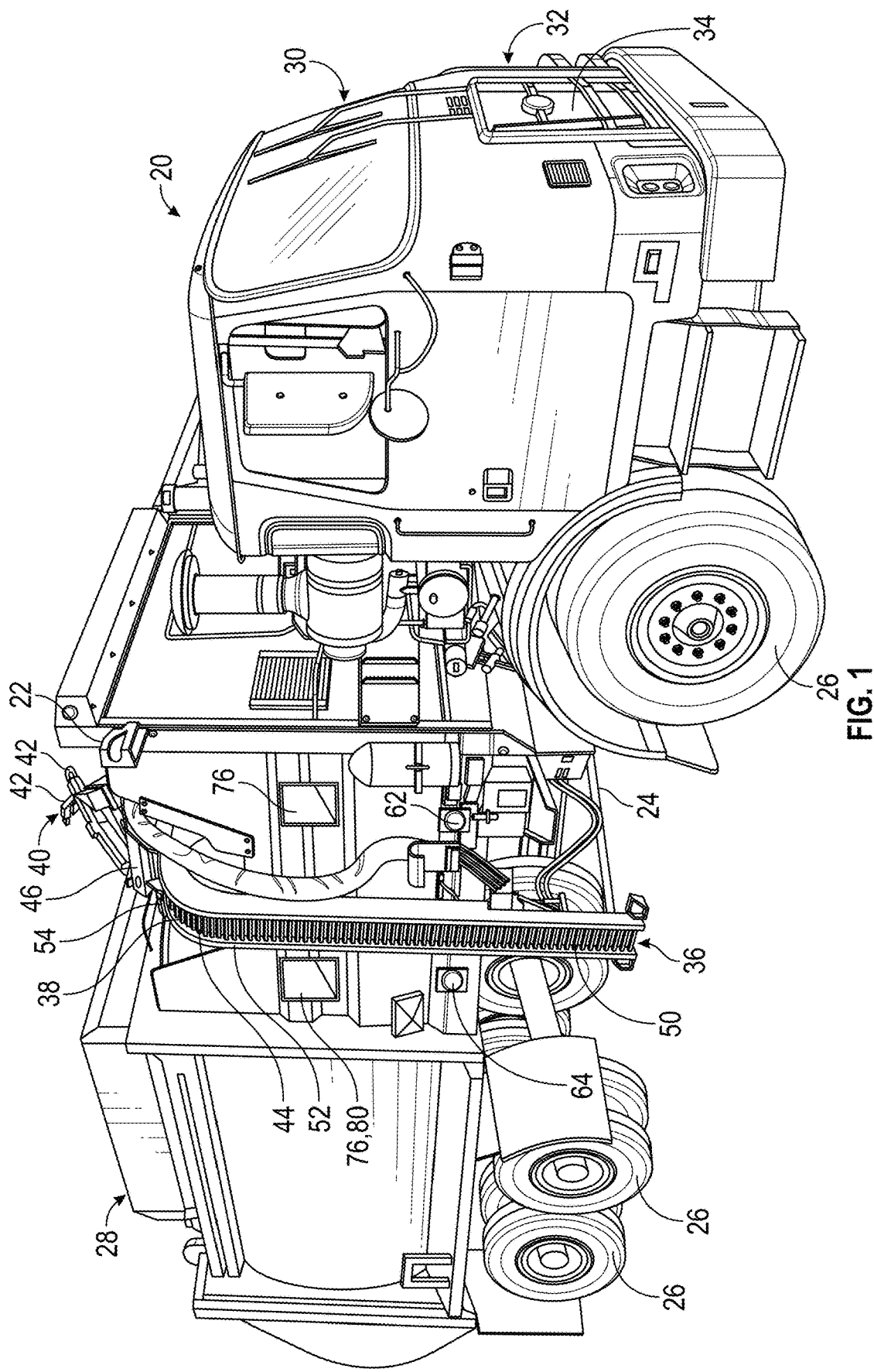
FIG. 1 is a perspective view of a refuse vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to refuse vehicles and methods of operating and controlling refuse vehicles. Because residences are typically provided with standardized waste containers (often referred to as "toters") to store waste (e.g., rubbish, recyclables), refuse vehicles are likewise designed with a lifting system that is adapted to engage, lift, and empty material from within the standardized waste container into an on-board receptacle on the refuse vehicle. Because the lift system may have limited lateral mobility relative to refuse vehicle, the waste container should be properly positioned relative to the lifting system before engagement. Operators using traditional refuse vehicles lose time maneuvering the refuse vehicle relative to the waste container or vice versa by either visually attempting to align the refuse vehicle relative to the waste container (often with an imperfect line of sight) or by exiting the cab of the refuse vehicle to physically adjust the position of the waste container relative to the refuse vehicle so that the lifting system can properly engage the waste container. The time, money, and efficiency lost by improperly positioning the refuse vehicle relative to waste containers is avoided by the refuse vehicles according to the disclosure by incorporating different types of vehicle positioning systems.

The refuse vehicles shown in the FIGURES are equipped with a projector (e.g., lighting assembly) that emits light downwardly and outwardly away from the refuse vehicle. The emitted light defines a target area or target zone that corresponds to a range of locations relative to the lifting system of the refuse vehicle where a waste container should be placed before engagement. If the waste container is positioned within the target area, the lifting system on the refuse vehicle can theoretically engage, lift, and empty the waste container without needing additional relative movement (e.g., lateral movement, fore-aft movement) between the refuse vehicle and the waste container. The light emitted from the projector can be visible light (e.g., within the visible spectrum) so that an operator can readily see the target area from within the cab of the refuse vehicle and can stop the refuse vehicle when a waste container is visually confirmed to be positioned within the target area. In some examples, the cab of the refuse vehicle can be equipped with a display that presents visual data from a camera positioned proximate the projector. The camera monitors a field of view, which includes the target area, and presents the data received from the camera onto the display. Using the display, the operator within the cab of the refuse vehicle can reposition the refuse vehicle until the display shows the waste container is present within the target area. Once the waste container is positioned within the target area, the operator can initiate a collection sequence by moving the lifting system to engage and lift the waste container so that the contents can be emptied into the on-board receptacle. By removing the guesswork and subsequent correction normally involved in aligning the refuse vehicle relative to the waste container, the process of collecting waste during a route is streamlined. Significant cost savings are realized by maximizing the amount of time that an operator spends within the cab of the refuse vehicle and limiting time spent outside the cab moving waste containers. Both goals are accomplished by the vehicle positioning systems disclosed herein.

As shown in FIG. 1, a refuse vehicle 20 is adapted for retrieving and hauling refuse from waste containers. The refuse vehicle 20 can be a side loader, front end loader, or rear end loader, for example, that is arranged to lift and transfer contents of a waste container into an on-board receptacle 22. The refuse vehicle 20 has a vehicle chassis 24 that generally supports wheels 26, a vehicle body 28, and the receptacle 22. The vehicle body 28 can include a cab 30 and a motor housing 32 that receives a prime mover, shown as a motor 34. The motor 34 can be an electric motor, an internal combustion engine, hybrid engine, or other suitable rotational power producing device. The motor 34 produces rotational power that is transmitted to the wheels 26 to drive the refuse vehicle 20.

The on-board receptacle 22 is sized to receive the contents of multiple waste containers so that the refuse vehicle 20 can execute an extended route that may include several stops. Upon arriving at each site, a lifting system 36 (e.g., a hydraulic arm assembly, can tipper assembly, grabber arm assembly) can engage and raise a waste container until it is inverted or angled downward toward the on-board receptacle 22. The waste container can then be lowered to the ground and disengaged from the lifting system 36 so that the refuse vehicle 20 can drive to another location along its route and repeat the waste removal process.

As depicted in FIGS. 1 and 11-15, the lifting system 36 includes an arm 38 coupled to the vehicle body 28 and/or chassis 24. The arm 38 has a selectively movable jaw assembly 40 extending outwardly away from a distal end of the arm 38. The arm 38 moves laterally away from the vehicle body 28 to approach a waste container (e.g., the waste container 100, shown in FIG. 12). When the arm 38 and jaw assembly 40 reach a position proximate the waste container, an operator can prompt the jaws 42 of the jaw assembly 40 to close around the waste container 100. Closing the jaws 42 around the waste container 100 engages the waste container 100 so that the arm 38 and lifting system 36, more generally, can manipulate the waste container 100 to collect waste positioned within the waste container 100.

Once the waste container 100 is secured within the jaws 42 of the jaw assembly 40, the waste container 100 can be raised off the ground surface, toward the on-board receptacle 22. In some examples, the arm 38 includes an elevator track 44 to facilitate the waste container lifting process. The jaw assembly 40 is coupled to the elevator track 44, which defines a pathway for the jaw assembly 40 to travel relative to the refuse vehicle 20 and on-board receptacle 22. Once the jaw assembly 40 has secured the waste container 100 and the arm 38 has retracted inward, to its stowed position relative to the vehicle body 28, the jaw assembly 40 and waste container 100 can be lifted. In some examples, the jaw assembly 40 includes a carriage assembly 46 that interfaces with the elevator track 44. The carriage assembly 46 includes a motor 48 that can activate to drive one or more wheels or gears (not shown) to initiate upward movement of the jaw assembly 40 and waste container 100 relative to the elevator track 44. The wheels or gears of the carriage assembly 46 interface with steps 50 spaced along the elevator track 44. The steps 50 can be formed as a series of undulating peaks and valleys that mesh with the wheels or gears of the carriage assembly 46, so that the elevator track 44 and carriage assembly 46 are arranged in a rack-and-pinion style arrangement.

The elevator track 44 includes a lifting segment 52 and a dumping segment 54. The lifting segment 52 extends upwardly and approximately perpendicular to the ground surface below the refuse vehicle 20. The dumping segment 54 curves away from the lifting segment 52, toward the on-board receptacle 22. The dumping segment 54 can be defined by an arc of approximately 180 degrees, and is designed to invert the jaw assembly 40 and waste container 100 secured within the jaw assembly 40 above the on-board receptacle 22. As the carriage assembly 46, jaw assembly 40, and waste container 100 travel upward along the lifting segment 52, the waste container 100 remains substantially upright (shown in FIG. 12), which may prevent or inhibit waste received within the waste container 100 from falling out prematurely. As the carriage assembly 46 traverses the dumping segment 54 (shown in FIGS. 13 and 14), the carriage assembly 46 initially travels upwardly and laterally, and turns inward toward the vehicle body 28 and on-board receptacle 22. The rotation of the carriage assembly 46 caused by the arcing elevator track 44 within the dumping segment 54 rotates the carriage assembly 46 and, as a result, the waste container 100 received within the jaw assembly 40. As the carriage assembly 46 continues along the dumping segment 54 of the elevator track 44, the carriage assembly 46 continues to rotate until the carriage assembly 46 and waste container 100 within the jaw assembly 40 are facing and traveling downward toward the on-board receptacle 22. With the open end of the waste container 100 now facing downward and into the on-board receptacle 22, gravity causes a lid of the waste container 100 to open and the contents of the waste container 100 to fall out, into the on-board receptacle 22 below. Once the contents of the waste container 100 have been emptied and collected, the motor 48 on the carriage assembly 46 can reverse direction and move the carriage assembly backwards through the dumping segment 54 and downward along the lifting segment 52, until the waste container 100 is once again positioned on the ground below (shown in FIG. 15). The jaw assembly 40 can disengage from the waste container 100 and repeat a similar process with another waste container positioned along a route.

The lifting system 36 has limited lateral mobility to engage and secure waste containers 100, which may create delay in the waste collection process if the arm 38 and jaw assembly 40 are not properly aligned relative to a waste container 100 that should be emptied. When open, the jaws 42 may be spread apart from one another by a distance that corresponds to about 3 or 4 times the width defining a standard-sized waste container 100. For example, the jaws 42 can be spread apart by a distance of about 3 meters in the open position. If a waste container 100 is positioned partially or entirely outside of the two jaws 42, the jaws 42 may not be able to engage the waste container 100 without first moving one of the waste container or the refuse vehicle 20 to adjust the position of the lifting system 36 and, as a result, the jaws 42 relative to the waste container 100. Once a waste container 100 is positioned laterally between the jaws 42, the arm 38 and jaw assembly 40 can extend outward, toward the waste container 100. Once the arm 38 and jaw assembly 40 are within a predetermined range from the waste container 100 (e.g., 0.25 meters, 1 meter, etc.), the jaws 42 can be closed around the waste container 100. As the jaws 42 transition to a closed position, the jaws 42 at least partially surround and engage the waste container 100 so that the lifting and emptying process can be performed.

The refuse vehicle 20 streamlines the refuse collection process by providing significantly better visual cues to identify if and when a waste container 100 is positioned within a target zone or area, which corresponds to the range of locations positioned laterally between the jaws 42. The visual cues help an operator know with certainty that a waste container 100 is positioned laterally between the jaws 42 of the lifting system 36 and, as a result, able to be engaged and emptied by the lifting system 36 without any additional relative movement (e.g., forward or backward vehicle travel) between the refuse vehicle 20 and the waste container 100. The visual cues provided by the refuse vehicle 20 allow an operator to more efficiently execute the waste collection process from a waste container 100 along a route without leaving the cab 30 of the refuse vehicle 20. The visual cues also prevent mistakes from operators outside the cab 30, which can properly position waste containers relative to the lifting system 36 using the visual cues provided by the refuse vehicle 20. Similarly, the visual cues can be used to alert operators where the range of the lifting system 36 is positioned, and can allow operators to move outwardly away from the lifting system 36 to avoid unwanted contact.

Figure 2:
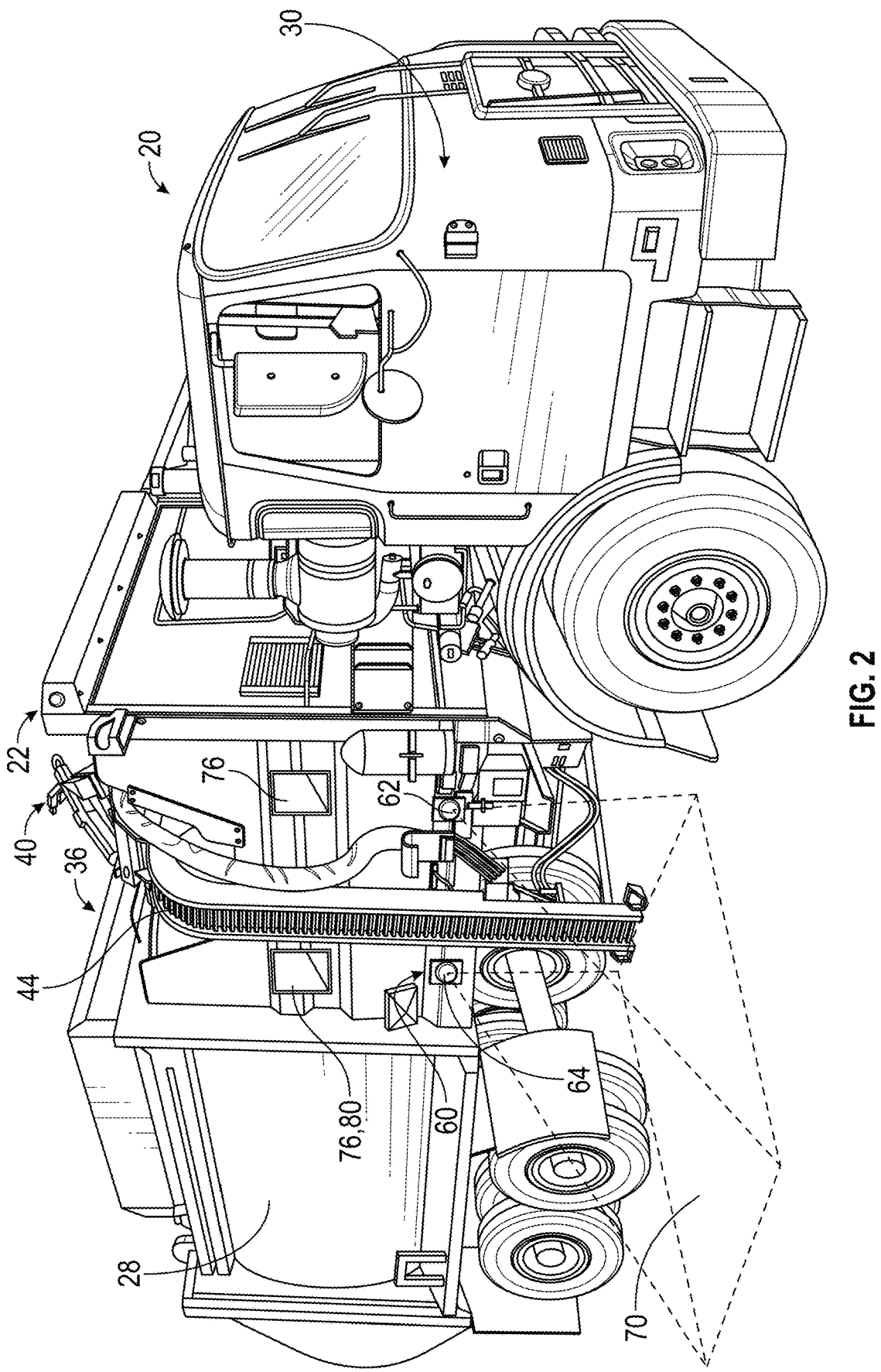
FIG. 2 is another perspective view of the refuse vehicle of FIG. 1, detailing an alignment system operating on a side of the refuse vehicle.

As depicted in FIGS. 1-2, the refuse vehicle 20 includes a projector 60. The projector 60 can include one or more lighting assemblies 62, 64 to generate light. In some examples, lighting assemblies 62, 64 are positioned on opposite sides of the elevator track 44 and the lifting system 36. The lighting assemblies 62, 64 are each arranged to emit light downward and outward toward the ground below and outward from the refuse vehicle 20. The lighting assemblies 62, 64 can include one or more light emitting diodes (LEDs) or lamps, for example, that generate visible light (i.e., light within the visible spectrum, having a wavelength between about 400 nm and 700 nm). In some examples, the lighting assemblies 62, 64 are configured to emit light outside of the visible spectrum (e.g., infrared light, ultraviolet light) onto the ground surface below and outward from the refuse vehicle 20.

The light emitted by the projector 60 defines a target area 70 below and outward from the refuse vehicle 20. The target area 70 can be configured to correspond directly to the lateral distance or area between the two jaws 42 of the jaw assembly 40. Accordingly, the target area 70 corresponds to a range of locations in which, if a waste container 100 is positioned, the jaw assembly 40 will be able to properly engage the waste container 100 without requiring additional movement between the refuse vehicle 20 and the waste container 100. Stated otherwise, if the waste container 100 is positioned within the target area 70 defined by the projector 60, the lifting system 36 can engage the waste container 100 and collect waste from the waste container 100 without requiring the refuse vehicle 20 to drive in any direction.

Figure 3:
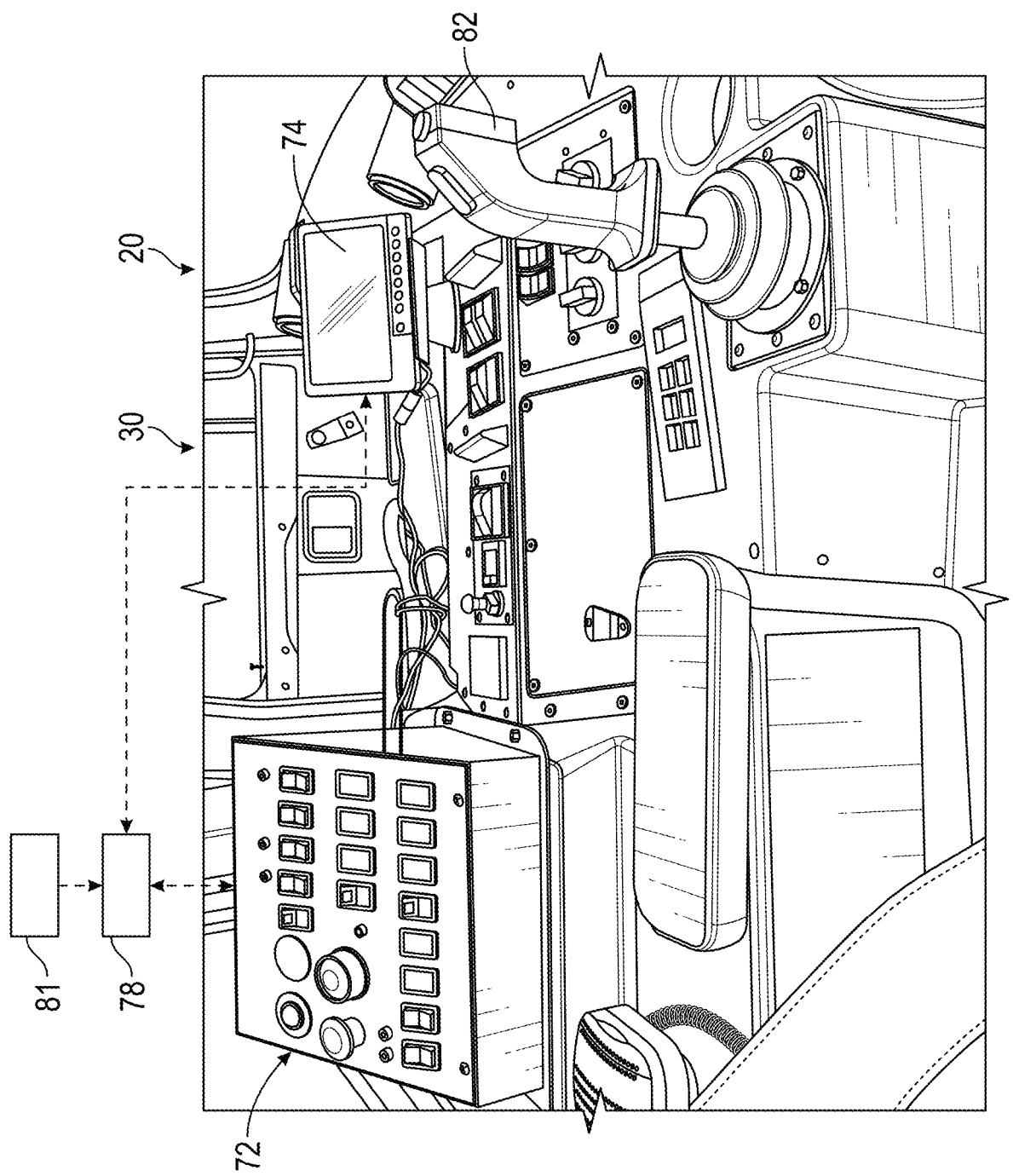
FIG. 3 is a perspective view of a cab of the refuse vehicle of FIG. 1, depicting various control systems present within the refuse vehicle.

The target area 70 generated by the projector 60 can be visible both externally and internally. By projecting the target area 70 in visible light, operators outside the refuse vehicle can easily identify the location in which the refuse containers 100 should be positioned for the lifting system 36 to successfully complete the waste collection process, while also being able to recognize areas to avoid standing while the lifting system 36 is operating. Simultaneously, the target area 70 can be seen from within the cab 30 of the refuse vehicle 20. As demonstrated in FIG. 3, the cab 30 of the refuse vehicle 20 can include a control system 72 including a series of inputs, along with a display 74. The display 74 is in communication with one or more cameras 76 positioned along the vehicle body 28 of the refuse vehicle 20. The cameras 76 each have a field of view extending outwardly away from the refuse vehicle 20. The cameras 76 are arranged so that their respective field of view overlaps with and includes the target area 70. Media (i.e., images or video) monitored and collected by the cameras 76 is provided to a processing unit 78 within the control system 72, which subsequently provides the media to the display 74 so that the media can be presented and viewed within the cab 30. By presenting the media on the display 74, an operator can view the target area 70 and waste container 100 simultaneously. Accordingly, the operator can verify whether the waste container 100 is present within the target area 70. If the waste container 100 is not positioned within the target area 70, the operator can use the display to determine which direction to drive the refuse vehicle 20 so that the waste container 100 will be positioned within the target area 70. Once the waste container 100 is verified to be present within the target area 70, the operator can initiate the waste collection process (e.g., using inputs within the control system 70) described above. In instances where the projector 60 emits light outside the visible spectrum, the cameras 76 are configured to detect and capture the light emitted from the projector 60 so that the target area 70 is visible on the display 74 but invisible to the naked eye externally from the refuse vehicle 20.

Figure 4:
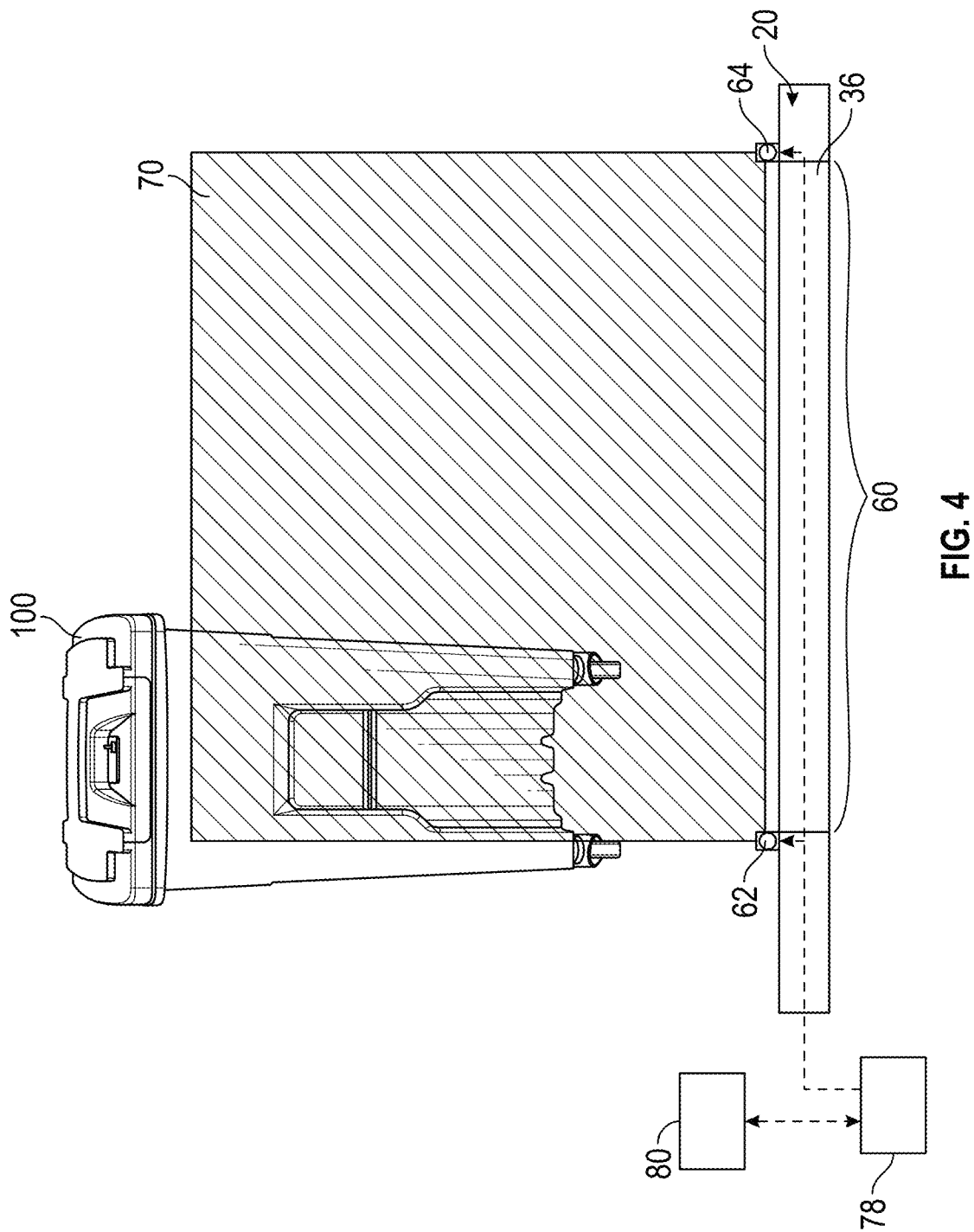
FIGS. 4-6 are schematic views of the alignment system operating on the side of the refuse vehicle of FIG. 1 to align a lifting system on the refuse vehicle relative to a waste container, according to an exemplary embodiment.
Figure 5:
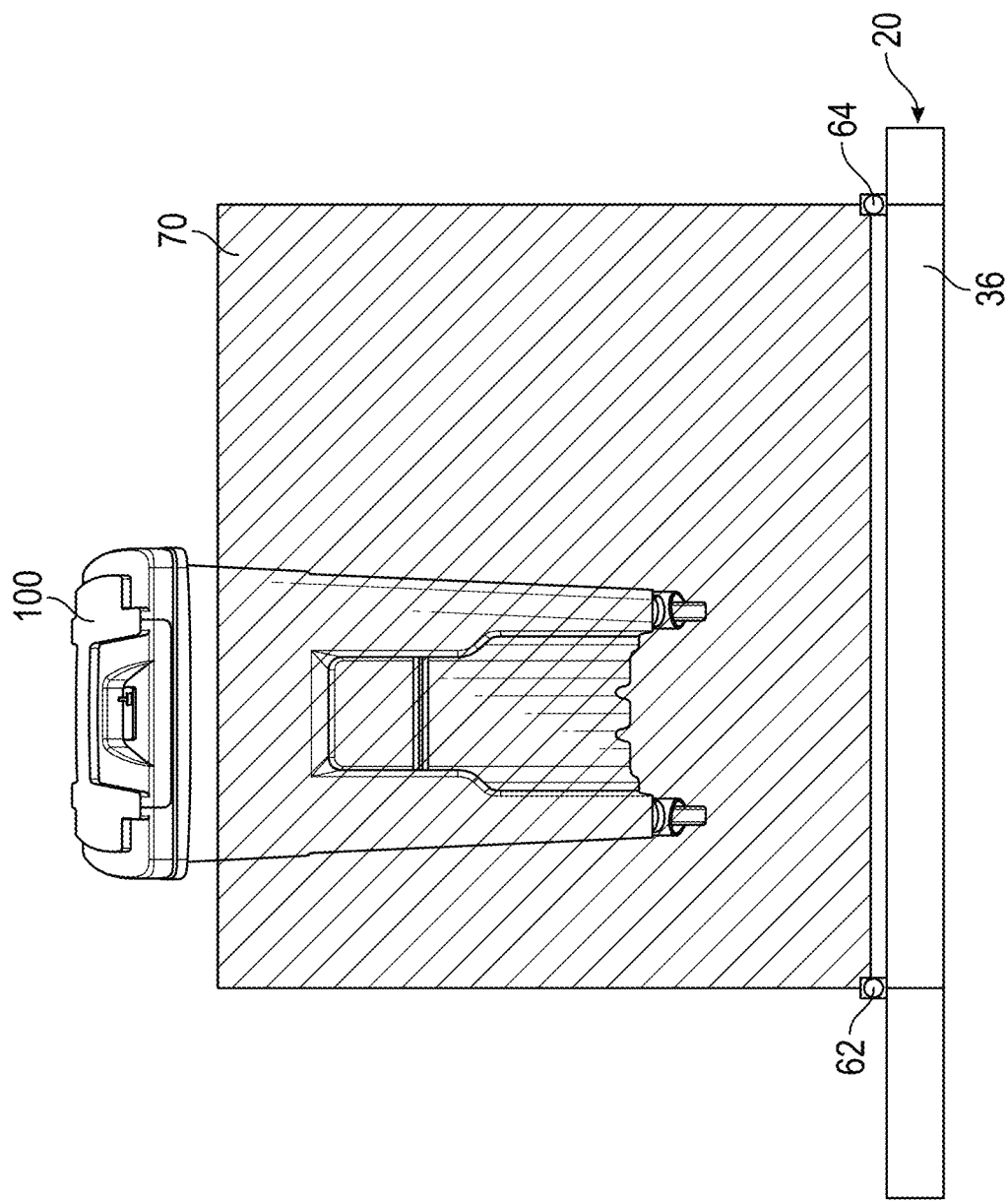
Figure 6:
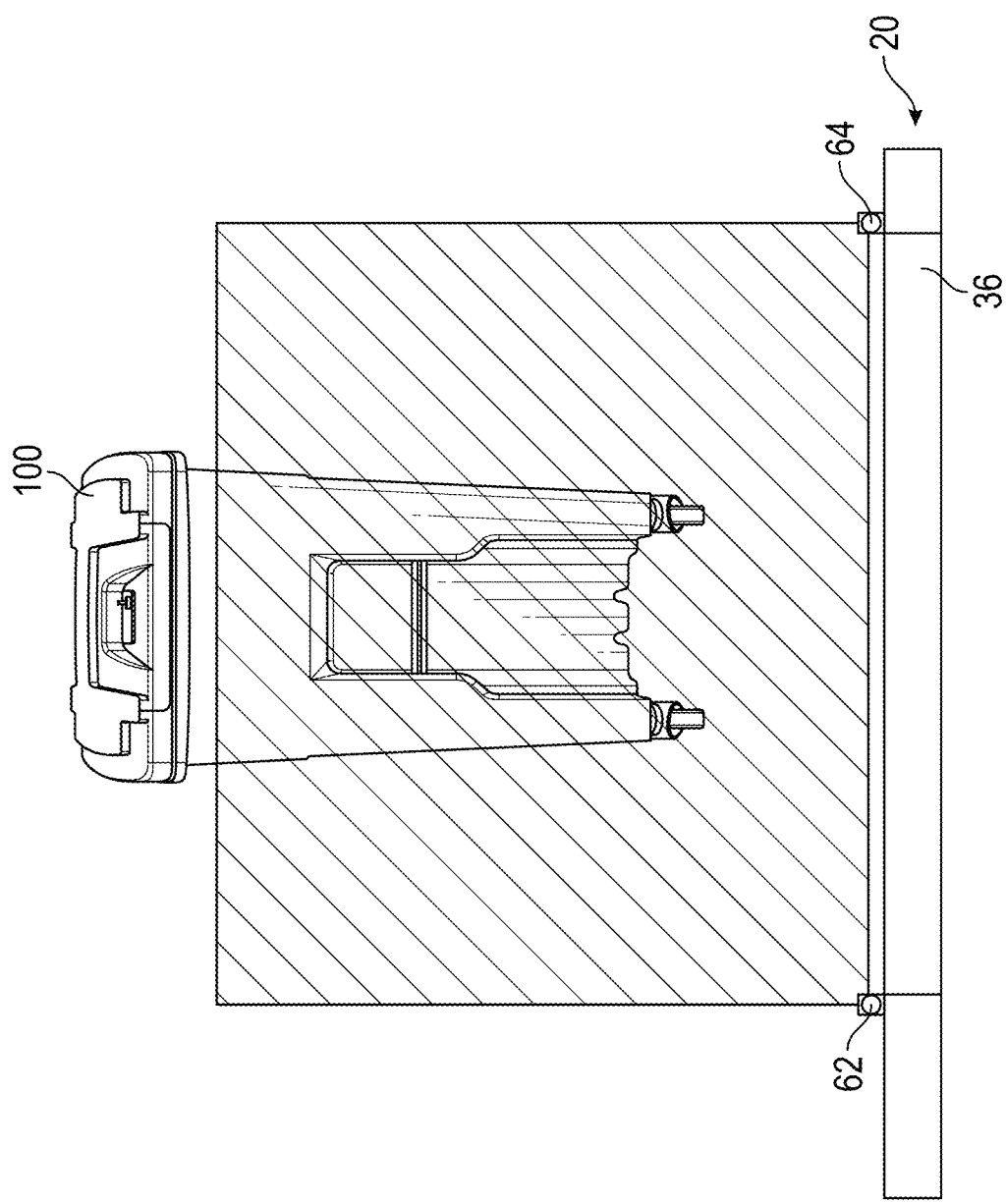

The target area 70 generated by the projector 60 can take on a variety of different formats. For example, as shown in FIGS. 4-6 and with continued reference to FIGS. 1-3, the projector 60 can produce a rectangular target area 70. The lighting assemblies 62, 64 straddling the lifting system 36 emit light having different wavelengths (e.g., yellow, green, red) depending upon a detected location of the waste container 100 relative to the target area 70. A sensor 80 (which can also be a camera or imaging device) positioned along the refuse vehicle 20 can continuously monitor the target area for obstacles, such as waste containers 100, present within the target area 70. The sensor 80 can be in communication with the processing unit 78 and an image analyzer 81, for example, which analyzes data taken by the sensor and determines whether and where a waste container 100 is located relative to the refuse vehicle 20.

As the refuse vehicle 20 initially approaches a waste container 100, the waste container 100 may be positioned partially or entirely outside of the target area 70 generated by the projector 60. If the sensor 80 detects that a waste container 100 is present within a sensor field of view but outside of the target area 70 generated by the projector 60, the sensor 80 can relay a signal to the processing unit 78. Upon receiving a signal that a waste container 100 is present within the sensor field of view but at least partially outside the target area 70, the processing unit can prompt the projector 60 to adjust a parameter of the light being emitted. For example, and as depicted in FIG. 4, the processing unit 78 can control the projector 60 to emit a red light. The red light can provide a visual cue to the operator that the waste collection process for the waste container 100 is not yet ready to be initiated because the refuse vehicle 20 is not properly aligned relative to the waste container 100. Additionally or alternatively, the processing unit 78 can control the projector 60 to pulse or otherwise modulate the light emitted from the projector 60 when the waste container 100 is detected to be outside the target area 70. Audio alarms can be generated by the processing unit 78 to further inform the operator within the cab 30 not to initiate the lifting system 36 to attempt to engage the waste container 100.

The audio and visual cues provided to the operator can communicate both a direction and magnitude that the refuse vehicle 20 should be moved in order to properly position the refuse vehicle 20 relative to the waste container 100 for waste removal. Using the display 74 within the cab 30, the operator can continuously monitor the position of the waste container 100 relative to the refuse vehicle 20 as the refuse vehicle 20 drives. When the sensor 80 detects that the waste container 100 is present within the target area 70 but positioned off-centered from the lifting system 36, the sensor 80 can once again convey a signal to the processing unit 78. The processing unit 78 can once again control the projector 60 to adjust a parameter of the emitted light. For example, the projector 60 can be controlled to emit yellow light when the waste container 100 is detected within the target area 70 but within a less preferred region (e.g., near a boundary of the target area 70), as depicted in FIG. 5. Upon receiving visual confirmation that the waste container 100 is present within the target area 70, the operator can initiate a waste removal procedure similar to that described above. Alternatively, the operator can continue to move the refuse vehicle 20 relative to the waste container 100. Once the sensor 80 detects the waste container is present within a preferred region of the target area 70 (e.g., centered), the sensor 80 can pass along a signal to the processing unit 78 indicating the same. The processing unit 78 can then control the projector 60 to once again adjust a parameter of the light being emitted. For example, and as depicted in FIG. 6, the projector can emit a green light to indicate that the waste container 100 is positioned in a desired location within the target area 70 and is ready to be engaged by the lifting system 36. With this visual confirmation, the operator can initiate the waste collection process from within the cab 30. Alternatively, the waste collection process can be initiated automatically when the processing unit 78 detects that a parking or service brake of the refuse vehicle 20 is engaged and a waste container 100 is detected within the target area 70.

Figure 7:
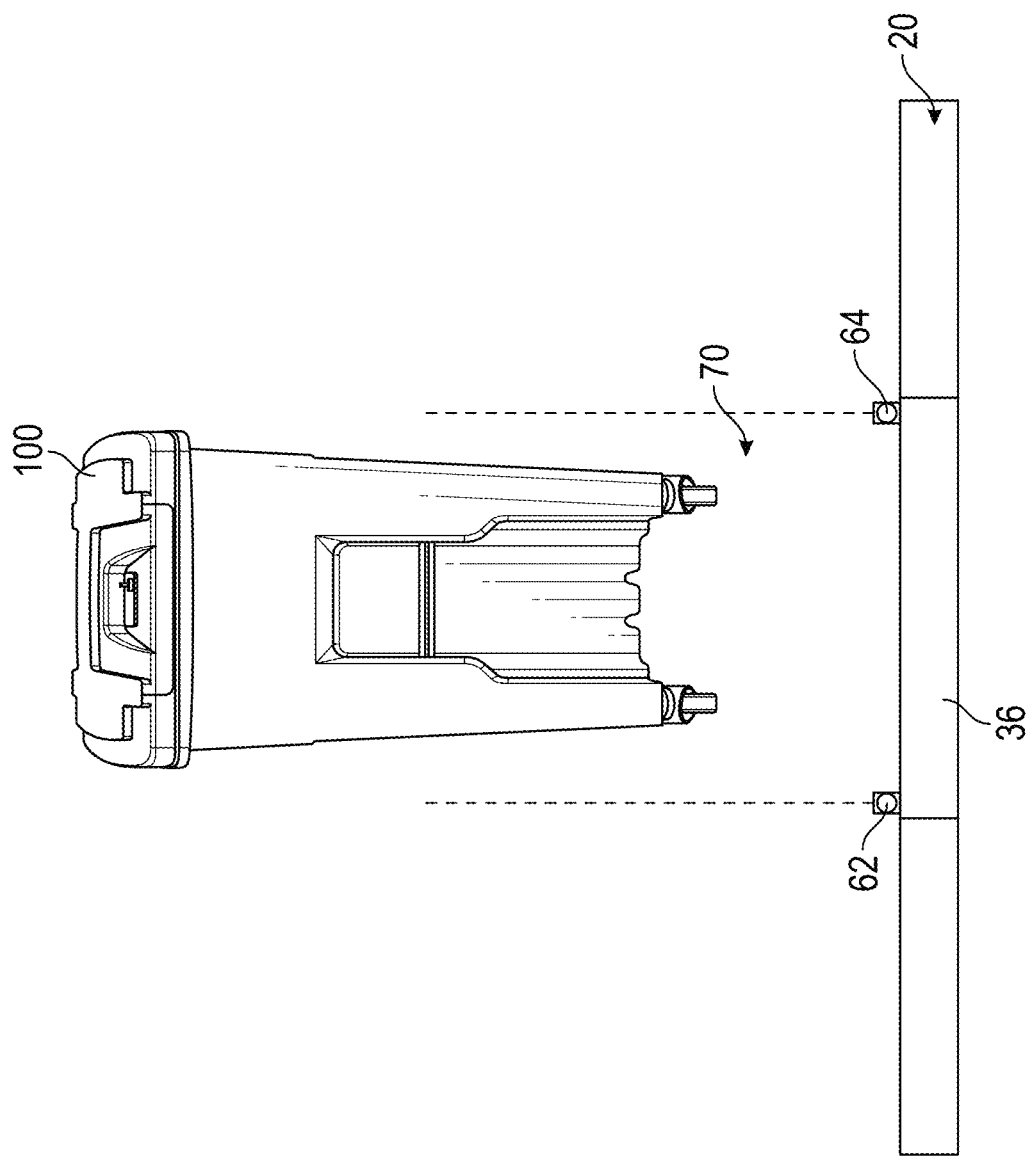
FIG. 7 is a schematic view of the alignment system operating on the side of the refuse vehicle of FIG. 1 to align a lifting system on the refuse vehicle relative to a waste container, according to another exemplary embodiment.

In other examples and as depicted in FIGS. 7-10, the projector 60 emits only the boundaries of the target area 70. For example, each of the lighting assemblies 62, 64 are arranged to emit light in a generally straight line downwardly and outwardly from the refuse vehicle 20. The generally straight lines emitted by the lighting assemblies 62, 64 can collectively define the lateral boundaries of the target area 70. As shown in FIG. 7, for example, the lighting assemblies 62, 64, each emit a solid and continuous (or dashed) line. The lines emitted by the lighting assemblies 62, 64 are once again visible to the operator either directly or via the display 74, and can be used to move the refuse vehicle 20 relative to the waste container 100 until the operator can verify that the waste container 100 is present between both boundaries emitted by the lighting assemblies 62, 64 and, accordingly, within the target area 70.

Figure 8:
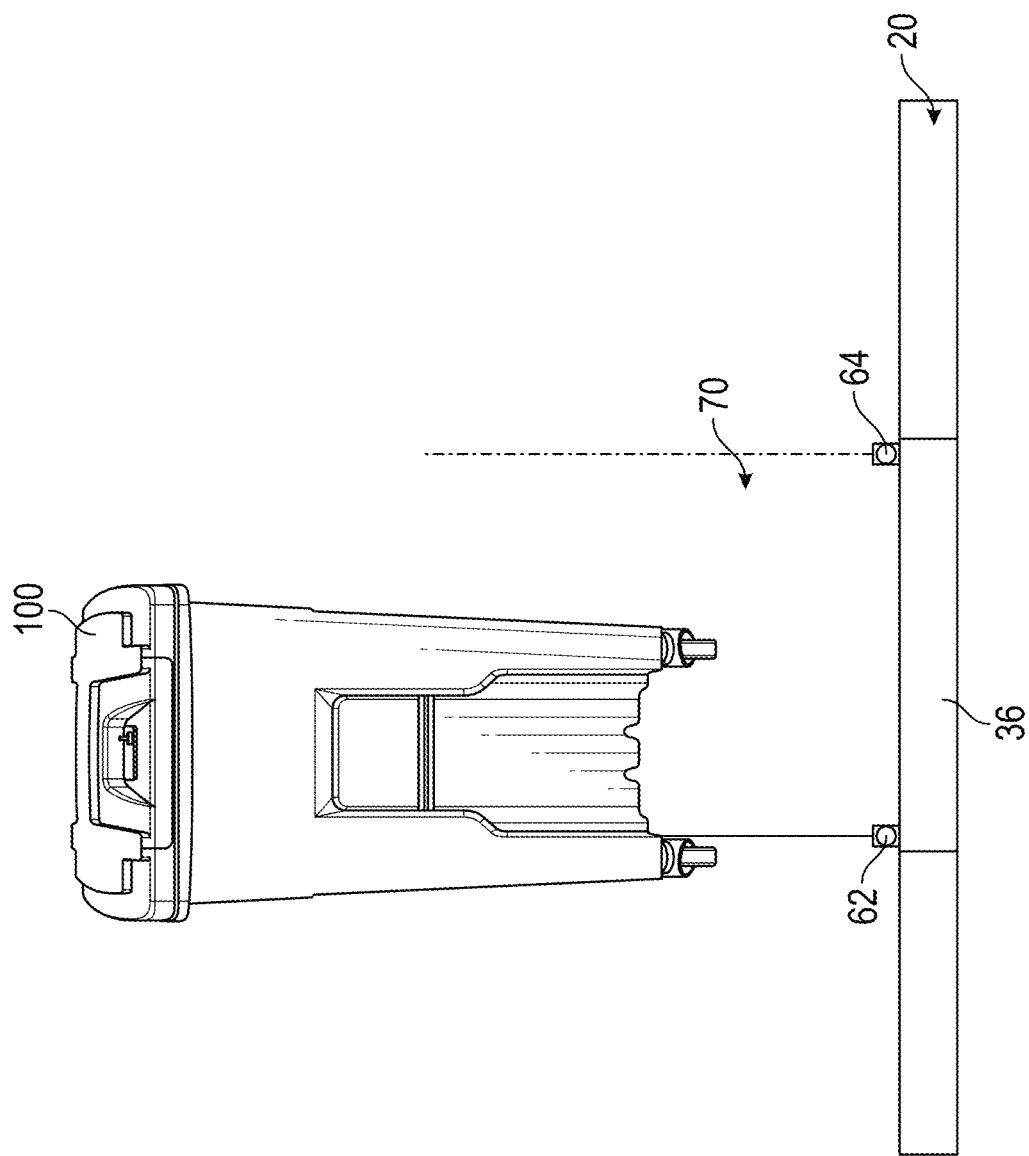
FIGS. 8-10 are schematic views of the alignment system operating on the side of the refuse vehicle of FIG. 1 to align a lifting system on the refuse vehicle relative to a waste container, according to yet another exemplary embodiment.
Figure 9:
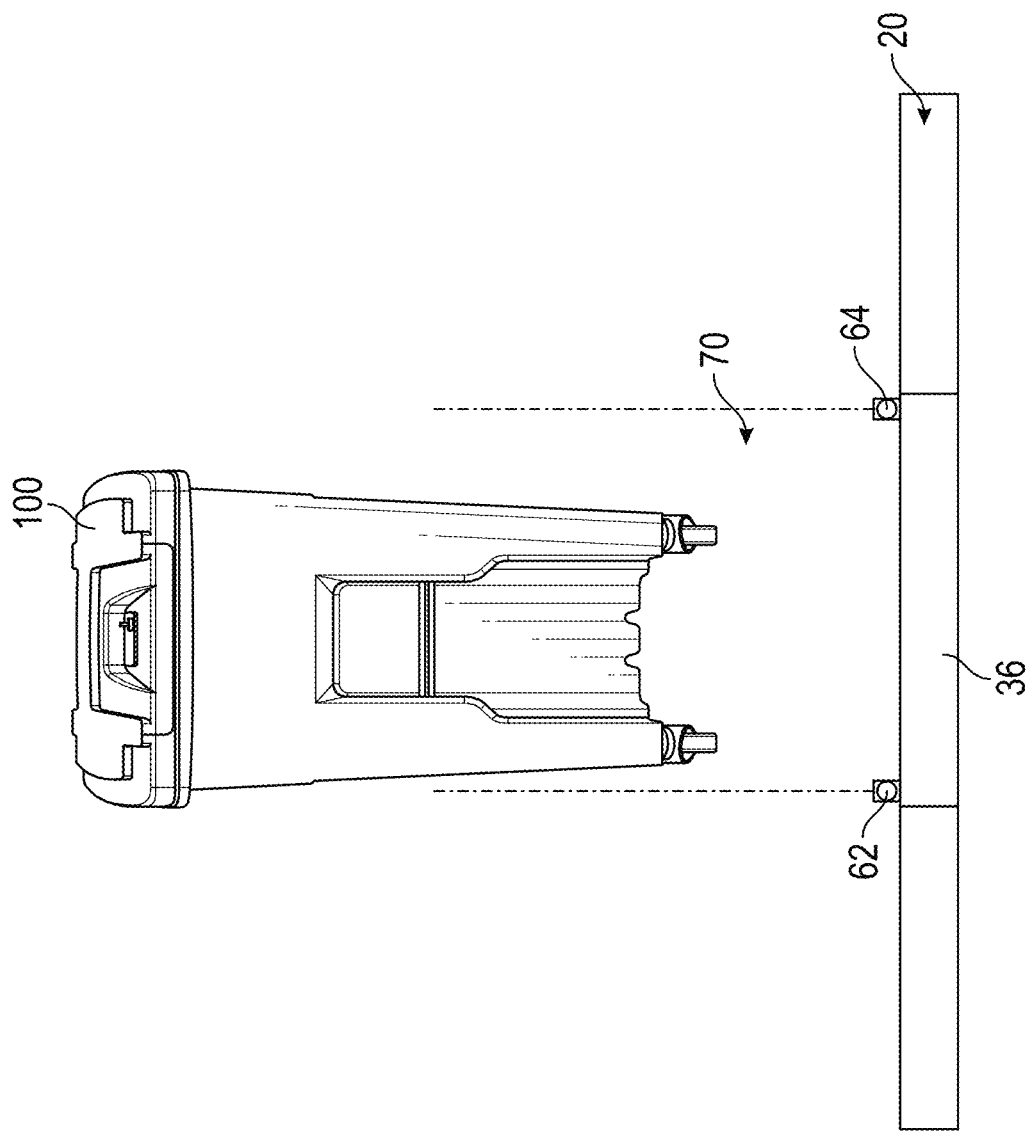
Figure 10:
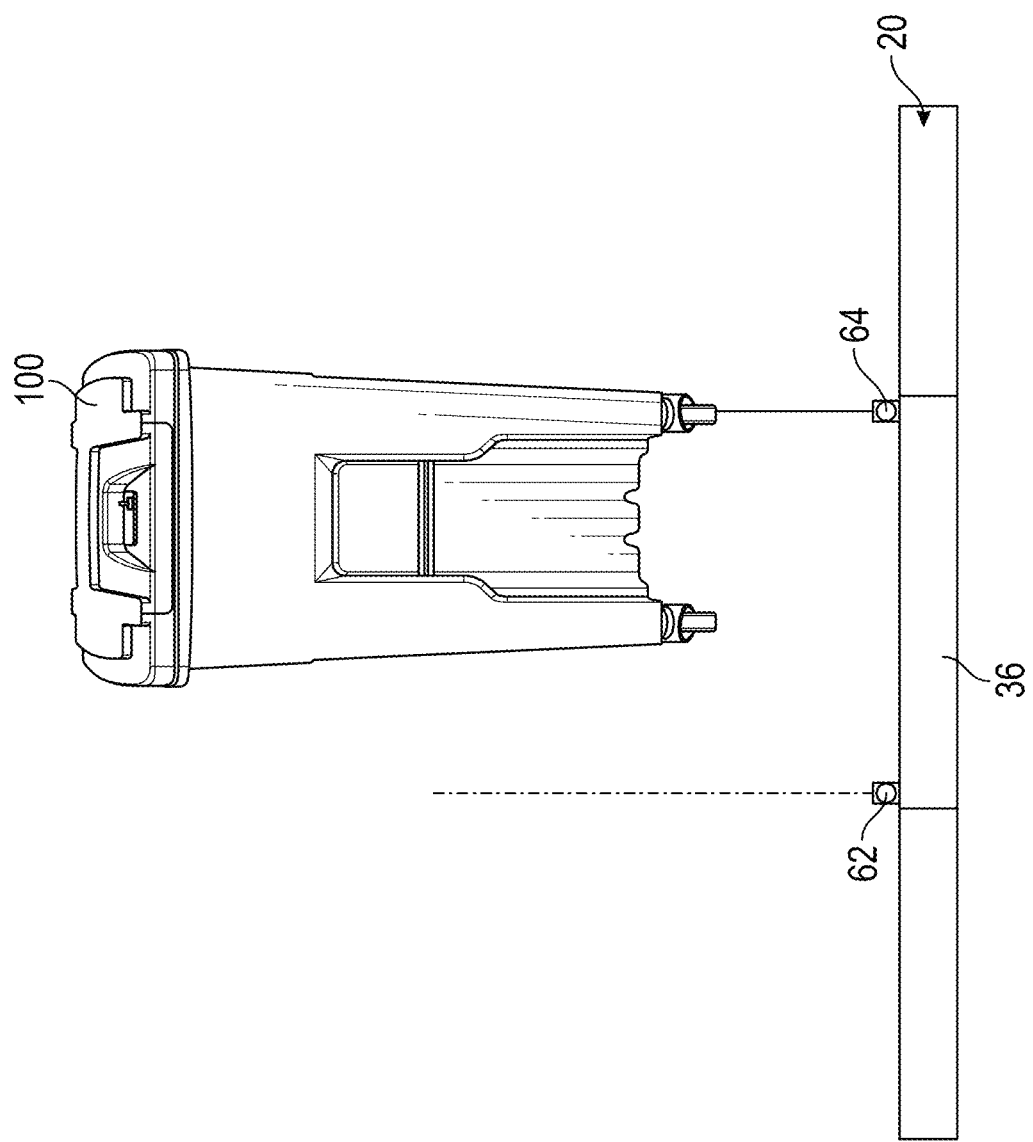
Figure 11:
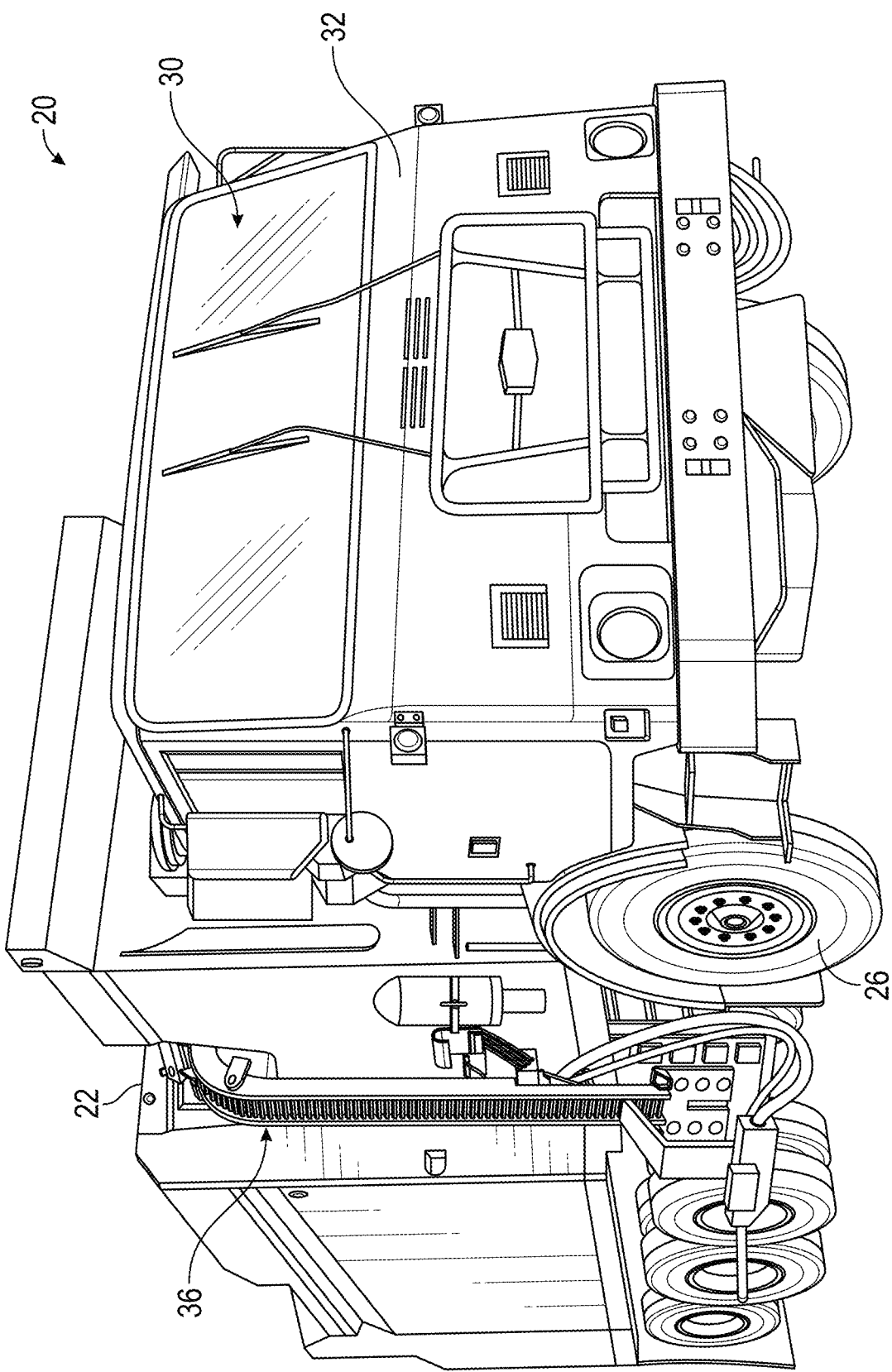
FIG. 11 is a perspective view of the refuse vehicle of FIG. 1, with the lifting system partially deployed.
Figure 12:
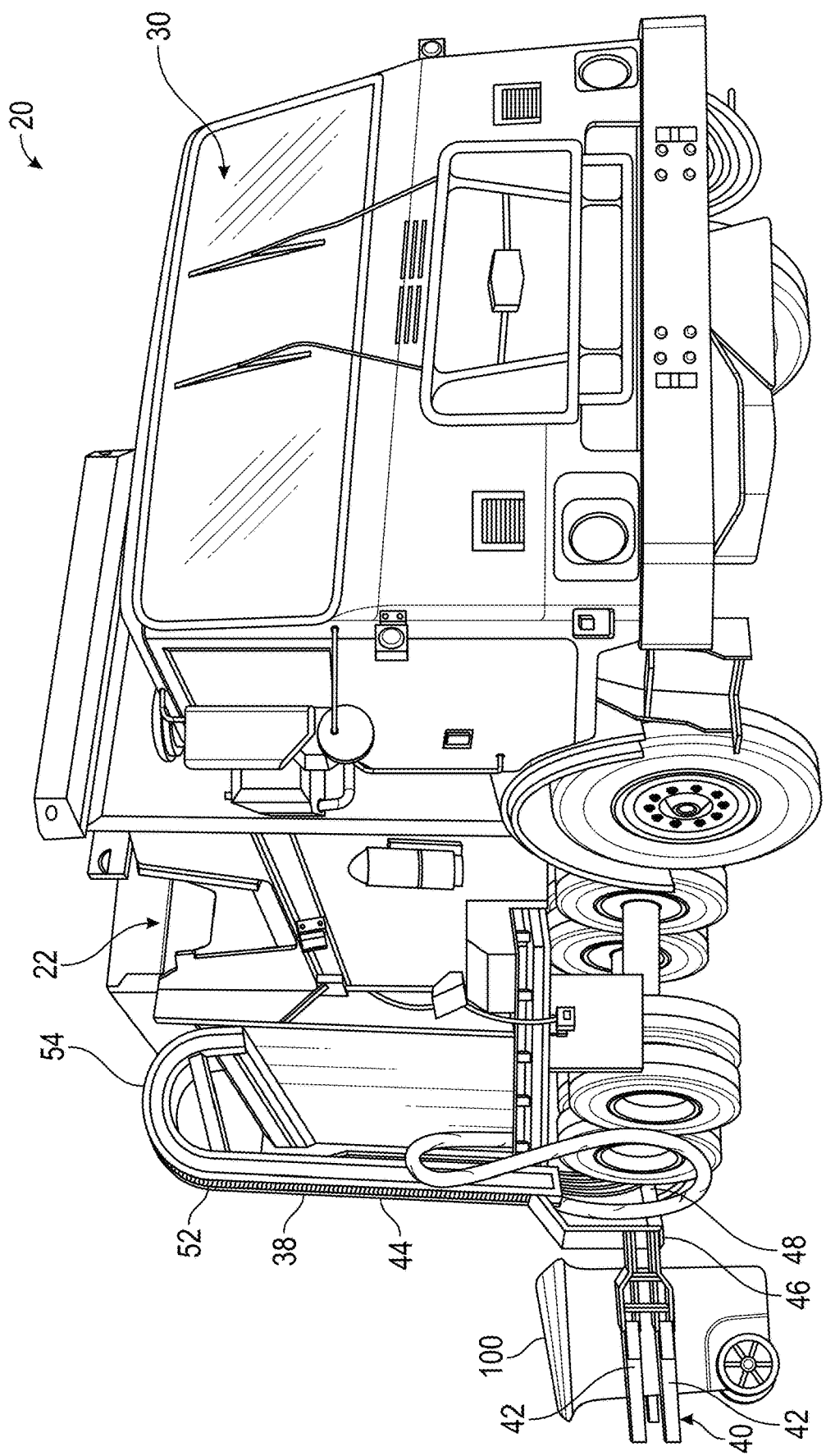
FIG. 12 is a perspective view of the refuse vehicle of FIG. 1, with the lifting system deployed and extended to engage a waste container.
Figure 13:
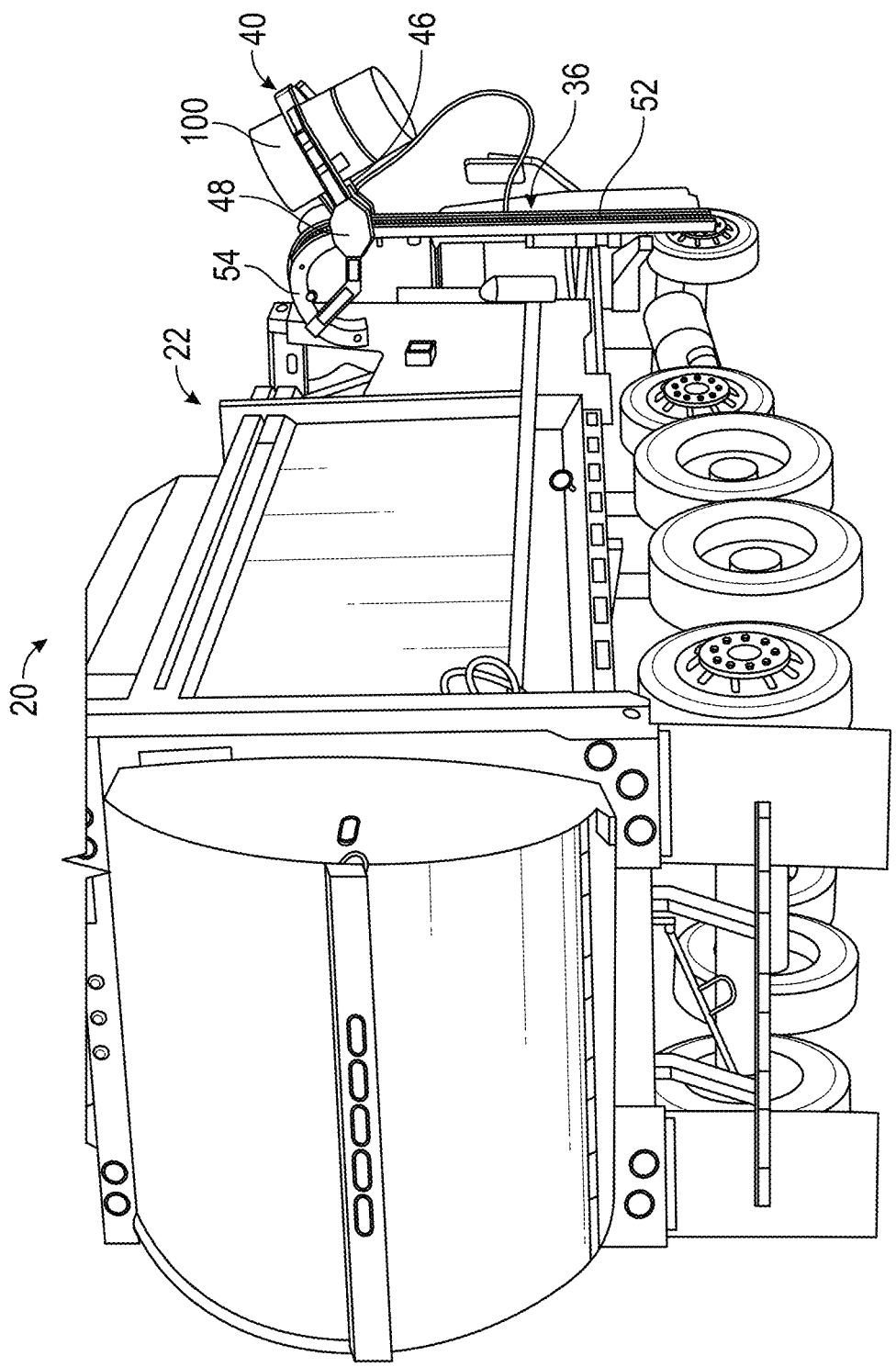
FIG. 13 is a perspective view of the refuse vehicle of FIG. 1, with the lifting system raising a waste container off the ground.
Figure 14:
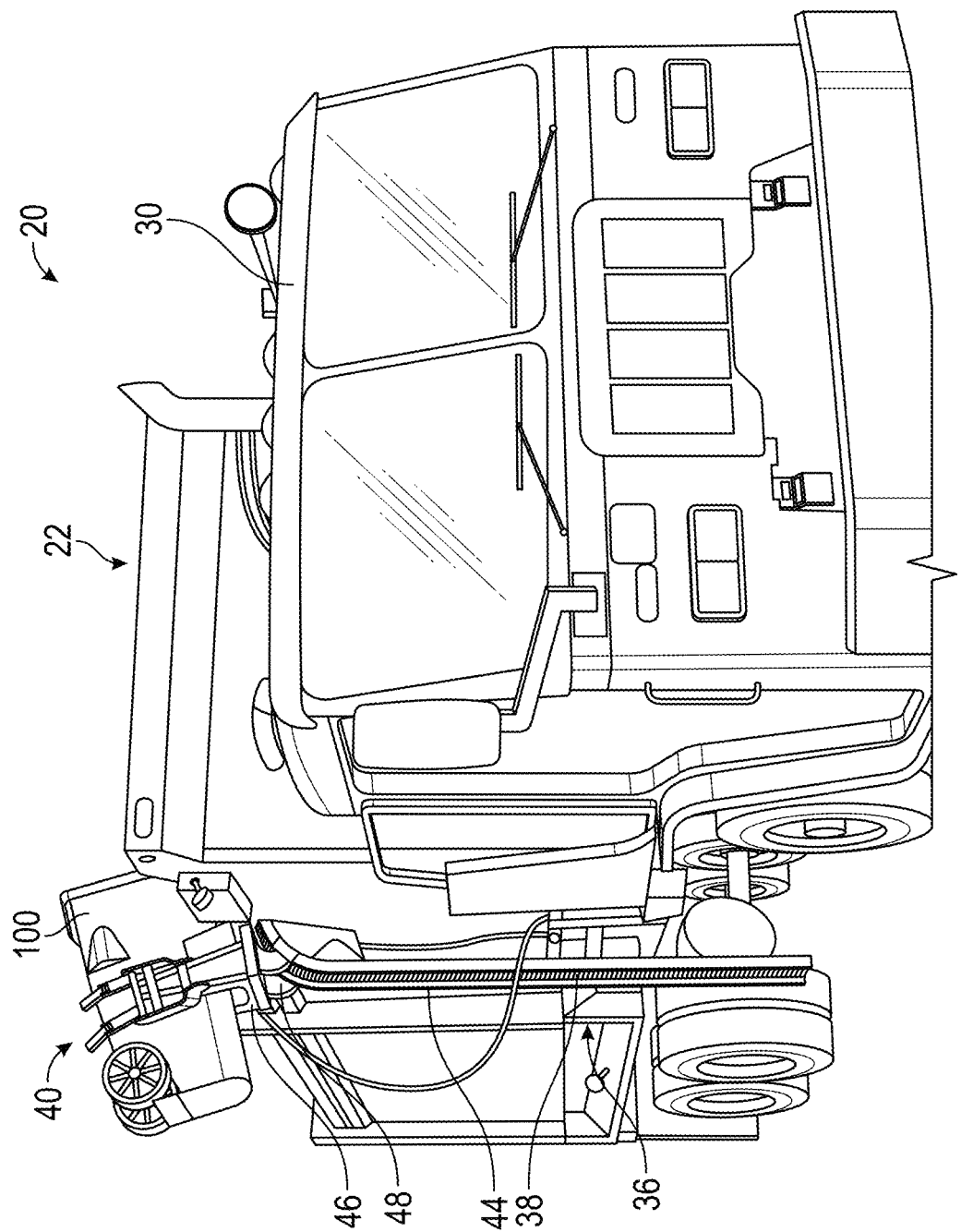
FIG. 14 is a perspective view of the refuse vehicle of FIG. 1, with the lifting system emptying the contents of a waste container into an on-board receptacle.
Figure 15:
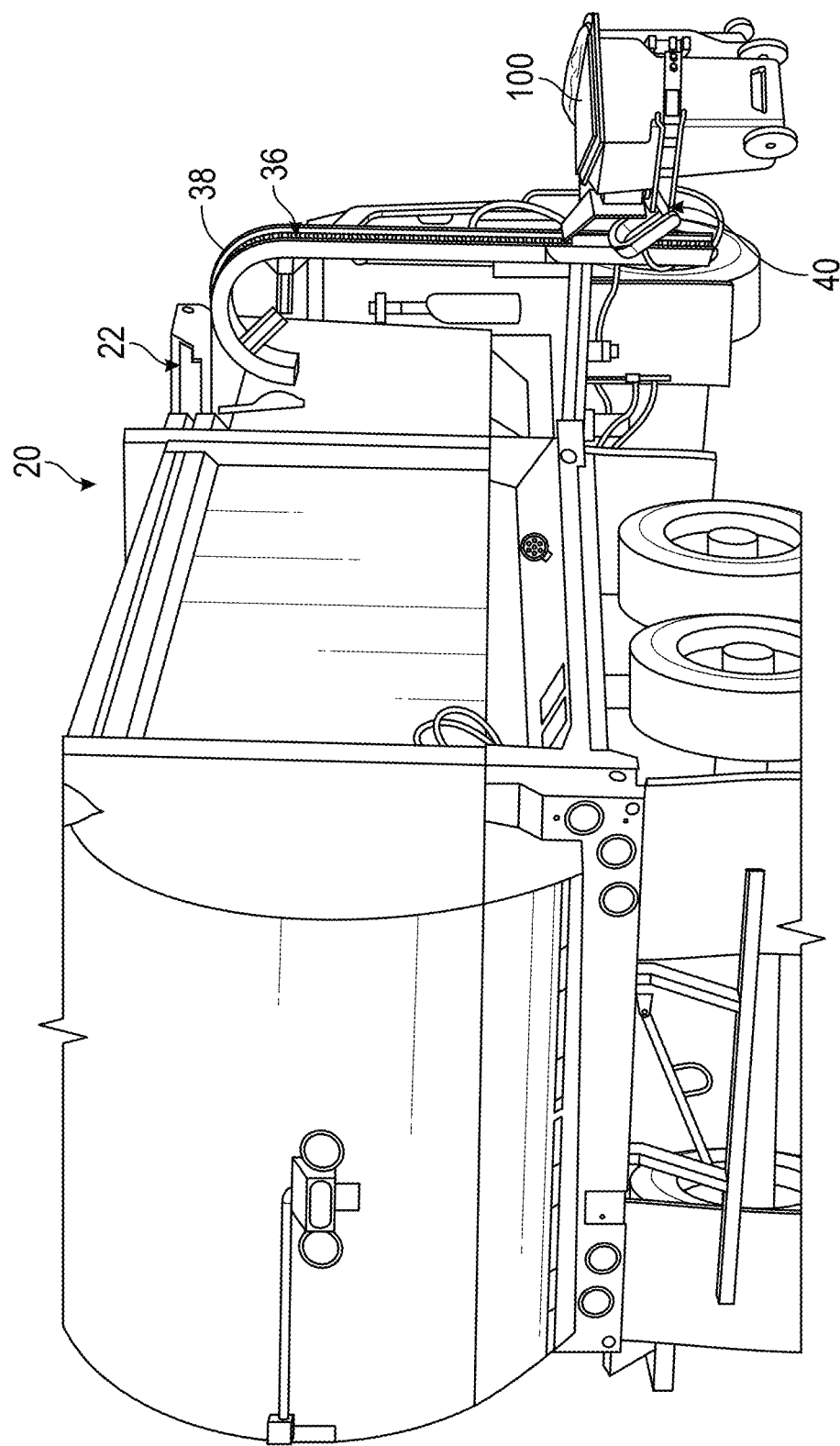
FIG. 15 is a perspective view of the refuse vehicle of FIG. 1, with the lifting system returning a waste container to the ground.

As depicted in FIGS. 8-10, the projector 60 can once again emit the boundaries of the target area 70 but can indicate whether an obstacle (e.g., a waste container 100) is detected within the pathway of the boundary. If the sensor 80 detects an obstacle impeding the light emitted from one of the lighting assemblies 62, 64 (as shown in FIGS. 8, 10), the sensor 80 can relay a signal indicating the same to the processing unit 78. The processing unit 78 can communicate with the projector 60 to adjust a parameter of the light being emitted. For example, the processing unit 78 can control the projector 60 to adjust a color of the light being emitted by the lighting assembly 62, 64 associated with the location where an obstacle was detected. For example, the lighting assembly 62 can be adjusted to emit red light if an obstacle is impeding the light from the lighting assembly 62 (shown in FIG. 8). The red light indicates that a waste container 100 is at least partially outside the target area 70 and not properly positioned for waste collection. If the light emitted from both lighting assemblies 62, 64 of the projector 60 is uninterrupted (shown in FIG. 9), the processing unit 78 can control the lighting assemblies 62, 64 to each emit green light, which indicates to an operator that the waste collection process can be initiated, as described above with respect to FIGS. 11-15.

Figure 16:
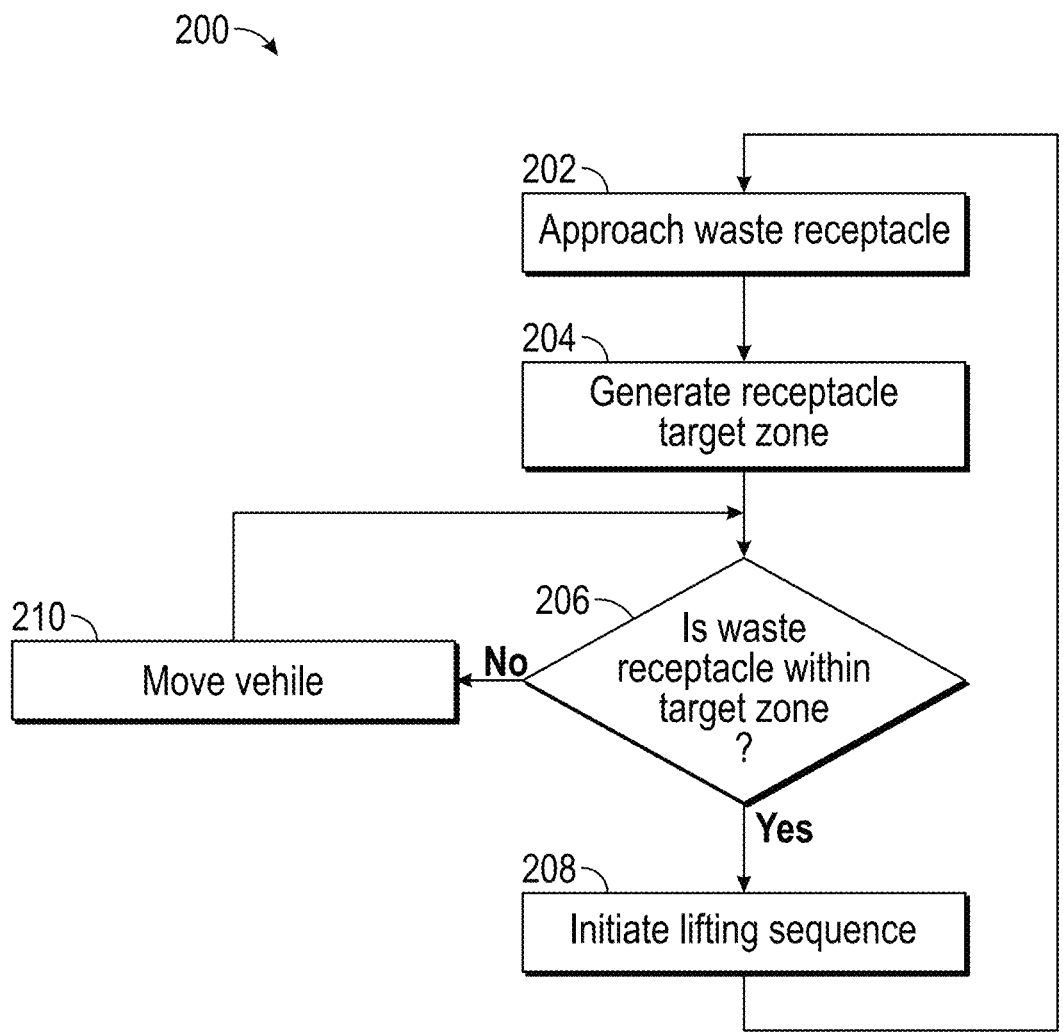
FIG. 16 is a process diagram detailing a method of operating a refuse vehicle, such as the refuse vehicle of FIG. 1.

Using the refuse vehicle 20 and projector 60 described above and with reference to FIG. 16, a method of operating a refuse vehicle 200 can be performed. The method for operating the refuse vehicle 200 begins at block 202, where the refuse vehicle 20 approaches a waste receptacle, such as the waste container 100. When the refuse vehicle 20 is driving or operating in situations where waste collection is not being attempted (e.g., the refuse vehicle is traveling at speeds exceeding 20 mph, for example), the processing unit 78 may control the projector 60 to power down or otherwise cease from emitting light and/or the target area 70.

Once the vehicle slows down to a threshold speed (e.g., below 20 mph or below 10 mph) and at block 204, the processing unit 78 can initiate a command to the projector 60 to begin emitting a receptacle target zone or target area 70. The target zone or target area 70 can take the form of any of the target areas 70 discussed above with respect to FIGS. 2 and 4-10, for example.

At block 206, the processing unit 78 and/or the operator determines whether a waste receptacle (e.g., the waste container 100) is present within the target area 70. The relative position of the waste receptacle relative to the refuse vehicle 20 can be monitored by any of the sensors 80 or cameras 76 (and the operator by way of the display 74), for example. As explained above, the sensor 80 can monitor the location of the waste receptacle relative to the target area 70 and can communicate signals to the processing unit 78 indicating the detected relative position between the waste receptacle and the target area 70. In response, the processing unit 78 can control the projector 60 to adjust parameters of the light emitted from the lighting assemblies 62, 64, for example, including light color or wavelength, as well as pulse frequency or duty cycle. If the processing unit 78 and operator determine that the waste receptacle is not present within the target area 70 generated by the projector 60, the operator can move the refuse vehicle 20 at block 210 and return to step 206 until the waste receptacle is detected and visually confirmed to be within the target area 70. In some examples, the processing unit 78 can automatically and/or autonomously adjust a position of the refuse vehicle 20 relative to the waste receptacle.

If the waste receptacle is detected to be wholly within the target area at step 206 (e.g., as shown within FIG. 6), the lifting sequence can be initiated at block 208. In some examples, the operator initiates and controls the lifting sequence from within the cab 30 using a joystick 82 or other buttons within the control system 72 to direct the lifting system 36, arm 38, and jaw assembly 40 outward toward the waste receptacle. In other examples, and as explained above, the processing unit 78 automatically initiates the lifting sequence and directs the lifting system 36, arm 38, and jaw assembly 40 outward toward the waste receptacle upon receiving a signal from the sensor 80 that the waste receptacle is present within the target area 70 and receiving an indication from a component within the control system 72 that a parking or service brake of the refuse vehicle 20 is engaged. The arm 38 and jaw assembly 40 can then extend outwardly away from the refuse vehicle 20, toward the waste receptacle, until a detected distance between the jaw assembly 40 and the waste receptacle is within a predetermined threshold distance (e.g., 0.25 m, 1.0 m) that will allow the jaws 42 to at least partially surround and engage the waste receptacle.

Once the waste receptacle has been engaged, the operator (or the processing unit 78) can prompt the arm 38 to retract toward the vehicle body 28 and on-board receptacle 22 of the refuse vehicle. Once the arm 38 of the lifting system 36 returns to its fully retracted position, the processing unit 78 can activate the motor 48 to drive the carriage 46, jaw assembly 40, and waste receptacle engaged by the jaw assembly 40 upward, along the elevator track 44. The carriage 46 can be driven upward along the elevator track 44 along the lifting segment 52 to the dumping segment 54, where the carriage 46 and waste receptacle received within the jaw assembly 40 are inverted, and angled downward toward the on-board receptacle 22. Aided by gravity, waste from within the waste receptacle is directed downward and into the on-board receptacle 22. Once emptied, the waste receptacle can be returned to the ground below the refuse vehicle 20 by reversing the motor 48 and lowering the carriage 46 along the elevator track 44. Once the waste receptacle is received on the ground surface, the jaws 42 can disengage the waste receptacle and the process 200 can be repeated.

Using the foregoing systems and methods described herein, refuse can be collected along routes in a much faster and economical manner. Operators receive visual cues and certainty that a waste receptacle is within the area where the lifting system can properly engage the waste receptacle and complete refuse collection without having to leave the cab. The aggregate impact of achieving correct vehicle alignment relative to the waste receptacles being emptied is significant, given the high volume of stops typically performed on a given route. Substantial cost savings are realized by minimizing or eliminating failed attempts to engage waste receptacles with the lifting system due to improper alignment. Similarly, operators working outside of the vehicle are provided with visual information that allows successful engagement by the lifting system along each stop within a route. The elimination of error reduces the time spent along a collection route, decreases the costs of performing a collection route, and improves the safety of the workers by allowing the workers to stay within the vehicle in more scenarios. Safety is further promoted by providing a visual indication of an area to avoid by operators outside the vehicle.

Figure 17:
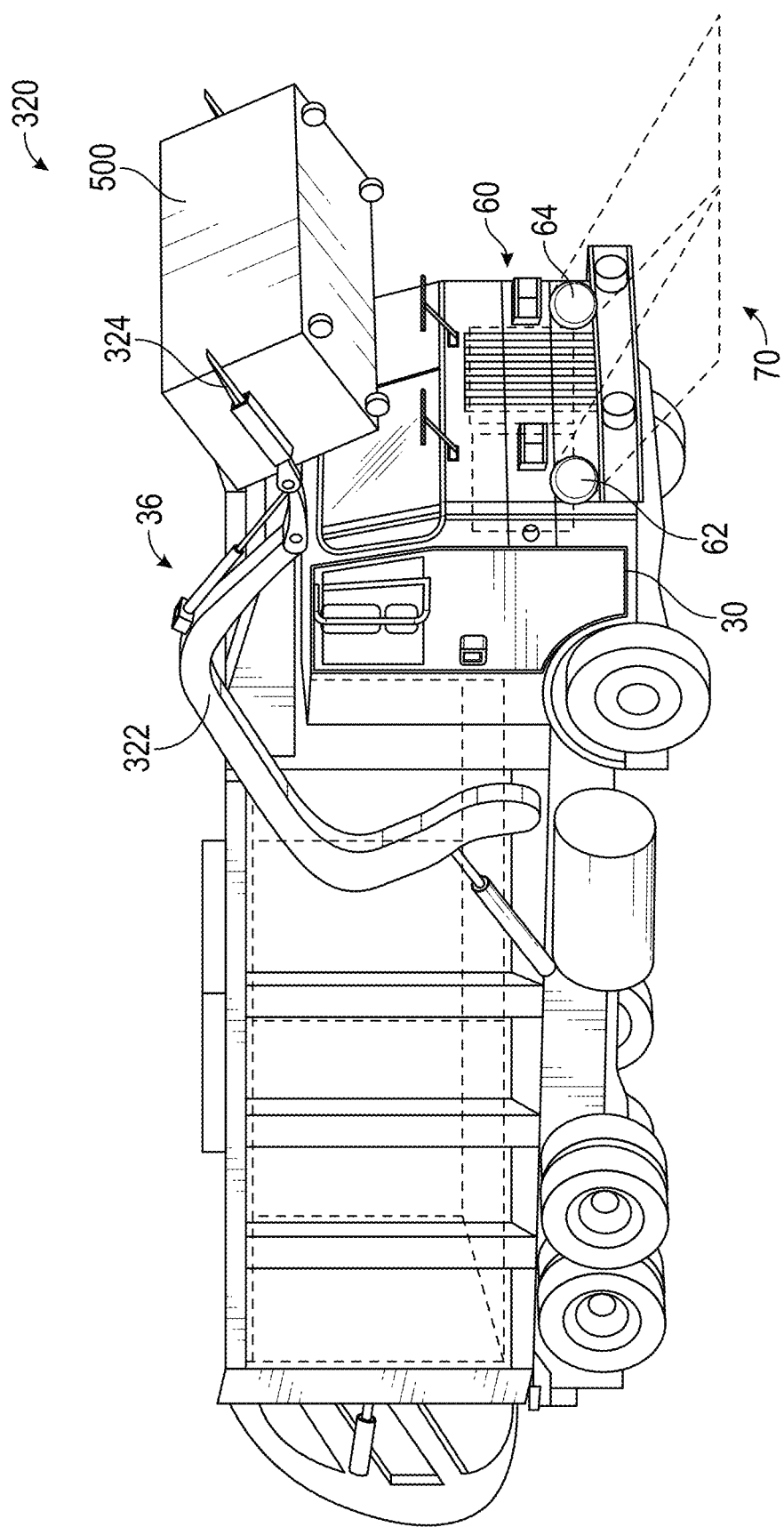
FIG. 17 is a perspective view of a refuse vehicle, according to another exemplary embodiment.
Figure 18:
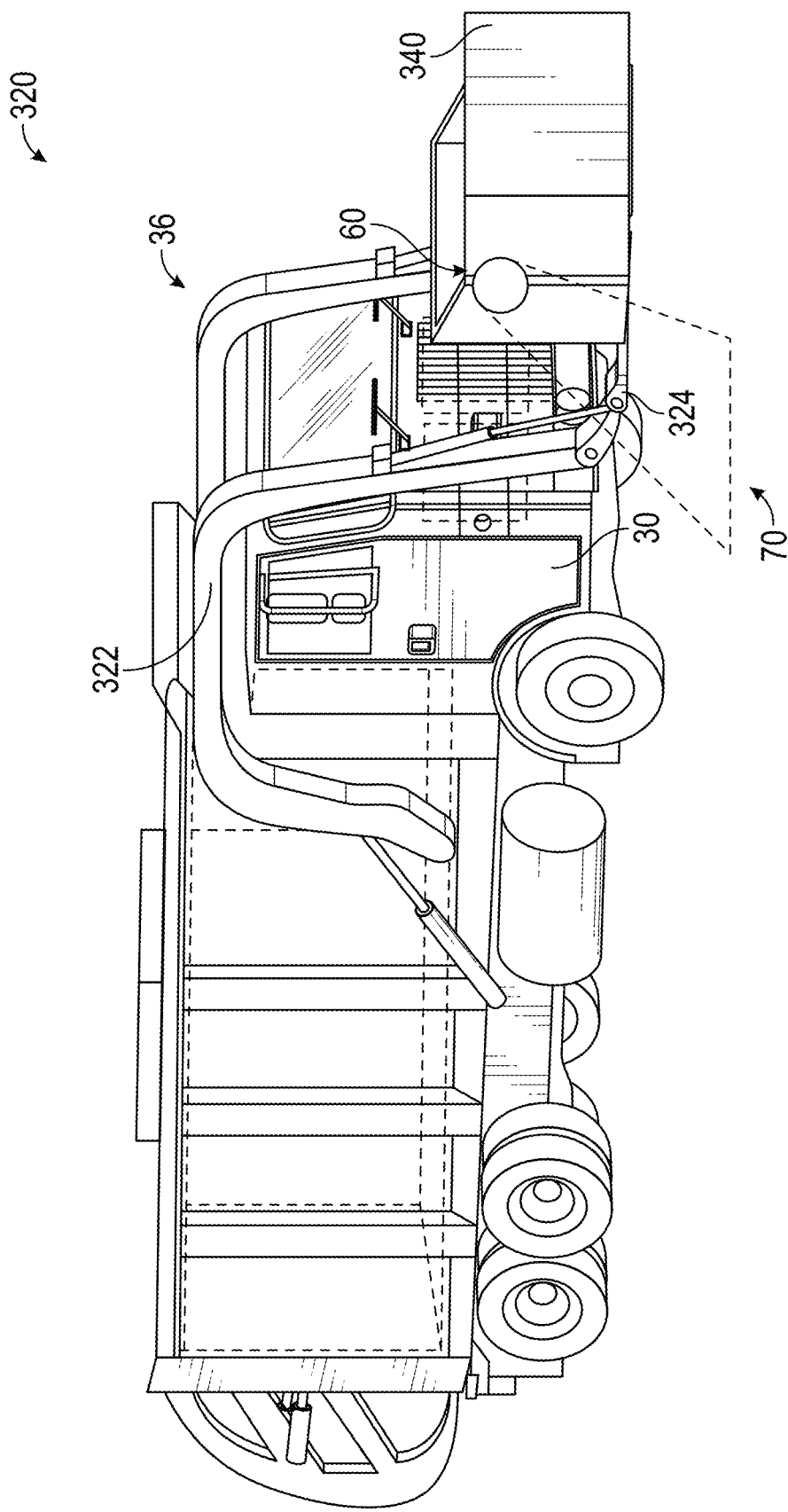
FIG. 18 is a perspective view of the refuse vehicle of FIG. 17, supporting a refuse vehicle accessory.

Although shown in the context of a side-loading refuse vehicle 20 throughout the disclosure, the concepts described herein are similarly applicable to front-loading and rear-loading refuse vehicles as well. For example, and as shown in FIGS. 17-18, another refuse vehicle 320 is depicted. The front-loading refuse vehicle 320, like the refuse vehicle 20, can include a similar projector 60 having lighting assemblies 62, 64 positioned along a front of the cab 30 or on the lifting system 36 itself. The front-loading refuse vehicle 320 have a lifting system 36 that includes rotatable arms 322 and articulating forks 324 that work together to engage, lift, and empty refuse containers. The arms 322 and articulating forks 324 extend forward from the cab 30 to interact with refuse containers (e.g., a commercial dumpster 500).

The projector 60 can operate in the same manner as described above to help an operator within the cab 30 steer the refuse vehicle 320 into position relative to a refuse container for waste removal. As depicted in FIG. 17, the two lighting assemblies 62, 64 project light downward and forward of the cab 30, and illuminate an area that corresponds with a location of the forks 324. Once again, the illuminated area can correspond with a "target area" or work zone 70 where the forks 324 can engage the interface upon the refuse container 500 without additional lateral movement. Similarly, the target area or work zone 70 can alert a worker where to avoid standing during vehicle operation. In some examples, the lighting assemblies 62, 64 are positioned directly on the forks 324 or the rotatable arms 322. Accordingly, the target zone 70 can help direct the lifting system 36 into engagement with a refuse container along multiple axes. The light emitted by the projector 60 will adjust as the lifting system 36 is moved vertically, which allows a user to see and observe a specific height of the forks 324. The light from the projector 60 can shine onto the refuse container 500, and into the interface of the refuse container 500 for engagement and lifting. As discussed above, the refuse vehicle 320 can also include one or more sensors 80 that detect a combination of the light from the projector 60 and the refuse container 500. The sensors 80 can be used, with a processing unit 78, to manually, automatically, semi-automatically, autonomously, or otherwise adjust a position of the refuse vehicle 320 relative to the refuse container 500.

The projector 60 can also be used on refuse truck accessories. For examples, and as depicted in FIG. 18, the refuse truck 320 supports a carry can device 340. The carry can device 340 is supported by the forks 324 and can be used to empty residential refuse containers 100 into the receptacle formed by the carry can device 340. Once again, the projector 60 emits light that defines a visible target zone or work zone 70 that can help to position the refuse vehicle 320 relative to the refuse container 100 to be emptied. The carry can device 340 can be placed in communication with the processing unit 78 and/or the sensor 80 to automate a portion of the positioning process as well.

Figure 19:
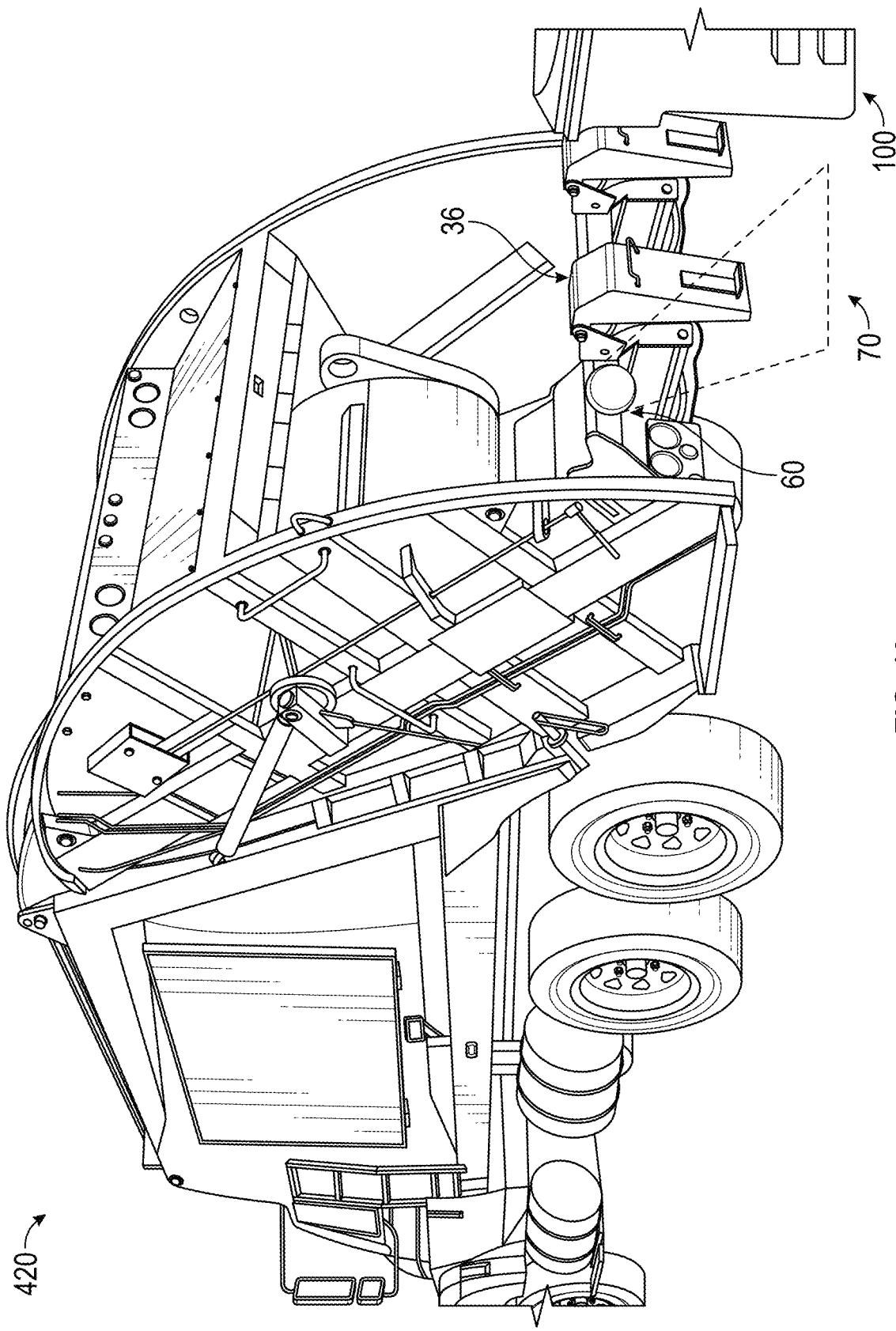
FIG. 19 is a perspective view of a refuse vehicle, according to another exemplary embodiment.

In still other examples, and as shown in FIG. 19, the alignment systems can be incorporated into rear-loading refuse vehicles, such as the rear-loading refuse vehicle 420. The projector 60 can project light rearward and downward to define a target zone 70 that is positioned behind the lifting system 36. Using the projected light from the projector 60, a worker can position the refuse containers 100 within a defined target zone 70 which corresponds with a location where the refuse container 100 can be engaged and emptied by the lifting system 36. Similarly, the worker can avoid the target area to avoid unwanted accidental contact with the lifting system 36 or refuse vehicle 420.

Additional control schemes can be used to operate the projector 60 and refuse vehicles 20, 320, 420 more generally. For example, the type of illumination or position of illumination can be adjusted based upon a selected refuse mode. The selected refuse mode can be a variety of different modes, include residential, commercial, cold weather, industrial, etc., and can be selected manually or automatically by the refuse truck 20, 320, 420 (e.g., upon detection of a location of the vehicle by a global positioning system). The projector 60 may illuminate a different target for commercial or industrial mode (e.g., wider, because refuse containers tend to be wider along these routes) than the residential mode, for example. Various other refuse mode type controls that can be incorporated into the refuse vehicles 20, 320, 420 are shown and described in commonly-owned U.S. Patent Application Publication No. 2020/0346657, filed Apr. 17, 2020, and entitled, "Operational Modes for a Refuse Vehicle," the content of which is hereby incorporated by reference in its entirety.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A refuse vehicle comprising:
   a chassis;
   a vehicle body supported by the chassis, the vehicle body defining a receptacle for storing refuse;
   a lift assembly configured to selectively engage a waste container, the lift assembly movable between a first position and a second position;
   a projector positioned to emit light outwardly away from the refuse vehicle and proximate the lift assembly and to define a target area when in an on state; and
   a processing unit in communication with the projector and configured to toggle through a plurality of preset modes to adjust a format of the target area defined by the projector in the on state.

2. The refuse vehicle of claim 1, wherein the processing unit is further configured to adjust a parameter of the light emitted by the projector.

3. The refuse vehicle of claim 2, further comprising a sensor in communication with the processing unit, the sensor configured to communicate a signal to the processing unit when an obstacle has been detected.

4. The refuse vehicle of claim 3, wherein the processing unit is configured to adjust the parameter of the light emitted by the projector based at least in part on a position of the obstacle relative to the target area.

5. The refuse vehicle of claim 1, wherein the plurality of preset modes includes a first mode and a second mode, the first mode being different than the second mode.

6. The refuse vehicle of claim 5, wherein the aspect of the target area is a size of the target area, such that in the first mode the target area is larger than the target area in the second mode.

7. The refuse vehicle of claim 1, wherein the target area corresponds to a location within which the lift assembly can extend outwardly away from the vehicle body to engage a waste receptacle wholly positioned within the target area without additional movement of the refuse vehicle.

8. The refuse vehicle of claim 1, wherein the projector comprises two lighting assemblies, wherein the two lighting assemblies are spaced apart from one another, each of the two lighting assemblies configured to independently emit the light outwardly away from the vehicle body and proximate the lift assembly to define the target area.

9. The refuse vehicle of claim 1, wherein the projector comprises a plurality of lighting assemblies including a first lighting assembly and a second lighting assembly, the first lighting assembly further including a sensor, the sensor being configured to detect an obstacle impeding light emitted by the first lighting assembly and communicate a signal to the processing unit in communication with the first lighting assembly that an obstacle has been detected at least partially outside the target area.

10. The refuse vehicle of claim 1, wherein the processing unit is further configured to automatically activate the projector in response to the refuse vehicle moving at less than a threshold speed or being stopped.

11. A refuse vehicle comprising:
    a chassis;
    a body coupled to the chassis, the body defining a receptacle for storing refuse;
    a lift assembly coupled to at least one of the body or the chassis; and
    a refuse container detection system configured to facilitate detecting when a refuse container is positioned within a target area for engagement by the lift assembly, wherein the refuse container detection system comprises:
      a projector emitting light outward from a carry can coupled to the lift assembly to define a boundary of the target area with light; and
      a controller in communication with the projector, wherein the controller controls the projector to adjust a parameter of the light emitted by the projector.

12. The refuse vehicle of claim 11, wherein the controller is further configured to adjust the parameter of the light emitted by the projector according to a selected one of a plurality of preset modes.

13. The refuse vehicle of claim 12, wherein the plurality of preset modes includes a first mode corresponding to a first sized refuse container and a second mode corresponding to a second sized refuse container, wherein the refuse container detection system is configured to adjust the target area to be a first size in response to the first mode being selected and adjust the target area to be a second size in response to the second mode being selected.

14. The refuse vehicle of claim 11, wherein the projector comprises two lighting assemblies, wherein the two lighting assemblies are spaced apart from one another, each of the two lighting assemblies configured to independently emit light outwardly away from the refuse vehicle body and proximate the lift assembly to define the target area.

15. The refuse vehicle of claim 11, wherein the controller is further configured to automatically activate the projector in response to the refuse vehicle moving at less than a threshold speed or being stopped.

16. The refuse vehicle of claim 11, further comprising a sensor in communication with the controller, the sensor to monitor the target area for an obstacle and communicate a signal to the controller when the obstacle has been detected.

17. The refuse vehicle of claim 11, wherein the light is light having a wavelength outside the visible spectrum, and wherein the refuse container detection system further comprises:
    a sensor in communication with the controller, the sensor configured to detect the light within the target area, and
    a display device in communication with the controller, wherein the controller is configured to provide an indication on the display device in visible light of the light in the target area.

18. The refuse vehicle of claim 11, wherein the lift assembly further includes a lifting device on the carry can, and wherein the projector is positioned along the carry can and configured to direct visible light outward from the carry can to define the boundary of the target area below the carry can.

19. The refuse vehicle of claim 11, wherein the refuse vehicle is operable in a first mode corresponding to a first sized refuse container and a second mode corresponding to a second sized refuse container, wherein the refuse container detection system is configured to adjust the target area to be a first size in response to the first mode being selected and adjust the target area to be a second size in response to the second mode being selected.

20. A refuse vehicle comprising:
    a chassis;
    a vehicle body supported by the chassis, the vehicle body defining a receptacle for storing refuse;
    a lift assembly configured to selectively engage a waste container, the lift assembly movable between a first position and a second position;

a projector positioned to emit light outwardly away from the refuse vehicle and proximate the lift assembly, the light defining a target area boundary defining a target area, wherein the projector is configured to selectively illuminate the target area boundary relative to a portion of the target area;

a first camera configured to detect the light emitted by the projector;

a second camera configured to detect the light emitted by the projector; and a display positioned within the vehicle body and in communication with the first camera and the second camera, the display configured to receive a signal from at least one of the first camera or the second camera to facilitate presenting at least a portion of the light emitted by the projector, the portion defining the target area.

* * * * *